(12) United States Patent
Kume et al.

(10) Patent No.: US 6,985,198 B2
(45) Date of Patent: Jan. 10, 2006

(54) PROJECTION TYPE OPTICAL DISPLAY SYSTEM

(75) Inventors: Yasuhiro Kume, Kawachinagano (JP); Takashi Kurihara, Ikoma (JP); Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 10/445,031

(22) Filed: May 27, 2003

(65) Prior Publication Data

US 2003/0231270 A1 Dec. 18, 2003

(30) Foreign Application Priority Data

May 27, 2002 (JP) ........................................ 2002-152026
Mar. 6, 2003 (JP) ........................................ 2003-060366

(51) Int. Cl.
*G02F 1/1335* (2006.01)

(52) U.S. Cl. ........................................ 349/119; 349/121
(58) Field of Classification Search ......... 349/117–119, 349/121
See application file for complete search history.

(56) References Cited

U.S. PATENT DOCUMENTS

| 5,161,042 A | 11/1992 | Hamada |
| 5,506,706 A | 4/1996 | Yamahara et al. |
| 5,777,709 A * | 7/1998 | Xu ............................... 349/120 |
| 6,057,901 A * | 5/2000 | Xu ............................... 349/121 |
| 6,359,671 B1 * | 3/2002 | Abileah ....................... 349/119 |
| 6,650,386 B1 * | 11/2003 | Shimoshikiryoh ........... 349/118 |
| 6,717,645 B2 * | 4/2004 | Shimoshikiryou et al. .. 349/141 |
| 2002/0033923 A1 * | 3/2002 | Shimoshikiryou et al. .. 349/141 |
| 2003/0011732 A1 * | 1/2003 | Ishihara et al. .............. 349/117 |

FOREIGN PATENT DOCUMENTS

| JP | 59-230383 A | 12/1984 |
| JP | 8-220521 A | 8/1996 |
| JP | 9-258328 A | 10/1997 |
| JP | 2001-174776 A | 6/2001 |
| JP | 2001-359112 A | 12/2001 |

* cited by examiner

Primary Examiner—James A. Dudek
(74) Attorney, Agent, or Firm—Birch, Stewart, Kolasch & Birch, LLP

(57) ABSTRACT

A projection type optical display system includes: a light source; at least one liquid crystal panel for modulating light that has been emitted from the light source; and a projection optical system for projecting the light that has gone out of the at least one liquid crystal panel. The liquid crystal panel includes: a liquid crystal layer; a first polarizer and a second polarizer, which are provided on the light incoming side and the light outgoing side of the liquid crystal layer, respectively; a first uniaxial optical compensator, which is provided between the liquid crystal layer and the first polarizer; a first biaxial optical compensator, which is provided between the first uniaxial optical compensator and the first polarizer; and a second biaxial optical compensator, which is provided between the liquid crystal layer and the second polarizer.

23 Claims, 25 Drawing Sheets

PROJECTION TYPE OPTICAL DISPLAY SYSTEM

BACKGROUND OF THE INVENTION

1. Field of the Invention

The present invention generally relates to an optical display system and more particularly relates to a projection type optical display system including a liquid crystal panel.

2. Description of the Related Art

A projection type optical display system may conduct a full-color display operation either by a three-panel method (i.e., with three liquid crystal panels used for the three primary colors of red, green and blue, respectively) or by a single-panel method (i.e., with just one liquid crystal panel used).

A three-panel projection type optical display system includes: a color separation optical system for separating light, emitted from a white light source, into three light rays representing the three primary colors of red (R), green (G) and blue (B); three liquid crystal panels for modulating the R, G and B light rays in accordance with image information; a color synthesizing optical system for synthesizing together the R, G and B light rays that have gone out of the liquid crystal panels while carrying the image information; and a projection optical system for projecting the color-synthesized light rays with the image information. The three-panel projection type optical display system can efficiently utilize the light that is radiated from the white light source and ensures excellent color purity. However, the three-panel type needs a greater number of components than a single-panel type. Thus, the three-panel type is normally less advantageous than the single-panel type in respects of cost and size.

On the other hand, a single-panel projection type optical display system needs just one liquid crystal panel and a smaller number of components. Thus, the single-panel type can be manufactured at a lower cost than the three-panel type, and can be used effectively as a projection type optical display system of a reduced size. Japanese Laid-Open Publication No. 59-230383 discloses a single-panel projection type optical display system that conducts a display operation in full colors by providing color filters for a liquid crystal panel. In such a projection type optical display system, however, incoming white light is absorbed into the color filters and only one-third of the incoming white light can be used. Accordingly, compared to a three-panel type that uses a similar light source, the brightness of the image displayed decreases to about one-third in the single-panel type.

To overcome such a problem, Japanese Laid-Open Publication No. 4-60538 discloses a projection type optical display system that can display a brighter image with the optical efficiency increased without using any color filter. In this projection type optical display system, the white light that has been radiated from a light source is separated into R, G and B light rays by dichroic mirrors that are arranged in a fan shape. The light rays are then incident onto a microlens array at mutually different angles. These light rays that have been incident onto a microlens are transmitted through the microlens so as to be focused onto their associated pixels of the liquid crystal panel in accordance with their angles of incidence.

As used herein, the "liquid crystal panel" is an optical element that includes a liquid crystal layer with optical anisotropy and that modulates the light being transmitted therethrough when the optical properties of its liquid crystal molecules are changed upon the application of a voltage to the liquid crystal layer. The liquid crystal panel can display an image, a character, etc. thereon. When the liquid crystal panel is combined with a backlight, a direct-viewing type liquid crystal display is obtained. Also, when the liquid crystal panel is combined with a light source and a projection optical system, a projection type optical display system is obtained.

In the liquid crystal panel, multiple pixel electrodes are regularly arranged in matrix (i.e., in columns and rows), and drive voltages, representing image signals, are independently applied to the respective pixel electrodes. The drive voltages may be independently applied to the pixel electrodes either by a simple matrix addressing technique or by an active matrix addressing technique that uses nonlinear two-terminal or three-terminal elements. In the active matrix addressing technique, switching elements such as MIMs (metal-insulator-metal elements) or TFTs (thin-film transistors) and interconnect electrodes for applying drive voltages to the pixel electrodes are provided.

The liquid crystal panel typically operates in a twisted nematic (TN) mode or in an electrically controlled birefringence (ECB) mode, for example. Specifically, in a TN mode liquid crystal panel, liquid crystal molecules in a nematic liquid crystal layer, which is provided between a pair of transparent electrode substrates, are oriented so as to have a twist angle of approximately 90 degrees. In an ECB mode liquid crystal panel on the other hand, the liquid crystal molecules in the nematic liquid crystal layer have a twist angle of approximately 0 degrees. In the TN mode liquid crystal panel, the liquid crystal molecules may be twisted either dextrorotatorily or levorotatorily. Small-sized high-definition liquid crystal panels for use in head mounted displays (HMDs) or projection type optical display systems normally the TN mode (except for reflection types).

The liquid crystal panel is normally designed to display color black when the liquid crystal molecules in its liquid crystal layer are aligned vertically. However, when a linearly polarized light ray is obliquely incident onto the vertically aligned liquid crystal layer, the light ray is transmitted as an elliptically polarized light ray due to the birefringence of the liquid crystal molecules. And when this elliptically polarized light ray passes through a polarizer on the light outgoing side, linearly polarized components, having the same polarization direction as the polarization axis of the polarizer, are transmitted through the polarizer. As a result, leakage of light is created in the black state to decrease the contrast ratio.

As for a projection type optical display system in which incoming light is radiated substantially along a normal to the liquid crystal panel, such a decrease in contrast ratio is a negligible one. However, in the projection type optical display system disclosed in Japanese Laid-Open Publication No. 4-60538 identified above, the R, G and B light rays, which have been separated by the dichroic mirrors, are radiated onto the liquid crystal panel so as to define a tilt angle of about 8 degrees with respect to a normal to the liquid crystal panel. Thus, the decrease in the contrast ratio of the image is significant in such a situation. Also, the R, G and B light rays have mutually different angles of incidence. Furthermore, due to the variation in the refractive index of the liquid crystal material with the wavelength, the elliptically polarized versions of the R, G and B. light rays have mutually different spot shapes. Accordingly, the balance among the outgoing R, G and B light rays will be disturbed, thereby making it difficult to reproduce color white or creating color unevenness.

Furthermore, in the optical display system disclosed in Japanese Laid-Open Publication No. 4-60538 identified above, light with a sufficiently high degree of parallelism (of about ±4 degrees) must be used to avoid the mixture of the R, G and B light rays. Thus, the light that has been emitted from the light source cannot be used so efficiently as in the three-panel type (that uses light with a degree of parallelism of about 11 degrees). Furthermore, in the optical display system disclosed in Japanese Laid-Open Publication No. 4-60538 identified above, if a projection lens having an F value of about 1 is used, then a light receiving angle will be about 26 degrees and the light may have a degree of parallelism up to about ±9 degrees. However, when light enters the liquid crystal panel at as high a light receiving angle as 26 degrees, the leakage of light will be quite perceivable and the decrease in contrast ratio will be significant.

To overcome these problems, Japanese Laid-Open Publication No. 8-220521 discloses a projection type optical display system that increases the contrast ratio by providing a phase plate between a liquid crystal panel and a polarizer. On the other hand, Japanese Laid-Open Publication No. 9-258328 discloses a projection type optical display system that minimizes the wavelength dispersion by providing a phase difference compensator between an optical path shifter and a spatial light modulator (SLM) with a liquid crystal layer. In the projection type optical display systems disclosed in Japanese Laid-Open Publications Nos. 8-220521 and 9-258328, the incoming light is supposed to reach the light incoming plane of the liquid crystal panel or the spatial light modulator along a normal to that plane. Actually, though, the incoming light is not incident onto the light incoming plane exactly along a normal to that plane. In the optical display system disclosed in Japanese Laid-Open Publication No. 4-60538, in particular, the incoming light defines a predetermined angle with respect to a normal to the light incoming plane of the liquid crystal panel. Thus, the method disclosed in Japanese Laid-Open Publication No. 8-220521 or No. 9-258328 is not applicable to the optical display system disclosed in Japanese Laid-Open Publication No. 4-60538 to minimize the decrease in contrast ratio.

Japanese Laid-Open Publication No. 2001-174776 discloses a three-panel projection type optical display system, which includes three liquid crystal panels and an integrator optical system. In this projection type optical display system, light is incident onto one of the three liquid crystal panels so as to define a tilt angle of about 12 degrees with respect to a normal to the light incoming plane of the liquid crystal panel. The liquid crystal panel includes an optical compensator, which is made of a polymer layer where the optic axis defines variable tilt angles in the thickness direction. By providing this optical compensator, the quantity of leaking light, resulting from the obliquely incident light, can be minimized and the incidence angle dependence of the contrast ratio can be reduced.

However, a projection lens, which is normally used currently, has an F value of about 1.7 and a light receiving angle of about ±16 degrees. Also, in the liquid crystal layer described above, the greater the angle of incidence of the incoming light, the greater the quantity of light leaking therefrom. In view of these considerations, it is rather necessary to compensate for the phase difference of light with an angle of incidence of about 12 degrees to about 25 degrees.

SUMMARY OF THE INVENTION

In order to overcome the problems described above, preferred embodiments of the present invention provide a projection type optical display system with the decrease in contrast ratio minimized.

A projection type optical display system according to a preferred embodiment of the present invention preferably includes: a light source; at least one liquid crystal panel for modulating light that has been emitted from the light source; and a projection optical system for projecting the light that has gone out of the at least one liquid crystal panel. The liquid crystal panel preferably includes: a liquid crystal layer; a first polarizer and a second polarizer, which are provided on the light incoming side and the light outgoing side of the liquid crystal layer, respectively; a first uniaxial optical compensator, which is provided between the liquid crystal layer and the first polarizer; a first biaxial optical compensator, which is provided between the first uniaxial optical compensator and the first polarizer; and a second biaxial optical compensator, which is provided between the liquid crystal layer and the second polarizer.

In one preferred embodiment, if the index ellipsoid of the first and second biaxial optical compensators has a, b and c axes as principal axes and if principal refractive indices on the a, b and c axes are na, nb and nc, respectively, the c axis is preferably substantially parallel to a normal to the major surface of each said biaxial optical compensator, the a and b axes preferably are defined on the major surface of the biaxial optical compensator, and nb>nc>na is preferably satisfied.

In another preferred embodiment, if the index ellipsoid of the first uniaxial optical compensator has a, b and c axes as principal axes and if principal refractive indices on the a, b and c axes are na, nb and nc, respectively, the c axis is preferably substantially parallel to a normal to the major surface of the first uniaxial optical compensator, the a and b axes are preferably defined on the major surface of the first uniaxial optical compensator, and na=nb>nc is preferably satisfied.

In still another preferred embodiment, the c axis of the first and second biaxial optical compensators preferably defines a tilt angle θ with respect to the normal to the major surface.

Specifically, the tilt angle θ defined by the c axis of the first and second biaxial optical compensators with respect to the normal to the major surface is preferably greater than 1 degree but smaller than 20 degrees.

In an alternative preferred embodiment, the c axis of the first uniaxial optical compensator preferably defines a tilt angle θ with respect to the normal to the major surface.

Specifically, the tilt angle θ defined by the c axis of the first uniaxial optical compensator with respect to the normal to the major surface is preferably greater than 1 degree but smaller than 20 degrees.

In yet another preferred embodiment, a total retardation of the first and second biaxial optical compensators, which is given by $d2^r \cdot \Delta nab$ (where $\Delta nab = nb-na$ and $d2^r$ is the total thickness of the first and second biaxial optical compensators), preferably satisfies 200 nm $< d2^r \cdot \Delta nab <$ 400 nm, and another total retardation of the first and second biaxial optical compensators, which is given by $d2^r \cdot \Delta nac$ (where $\Delta nac = nc-na$), preferably satisfies 100 nm $< d2^r \cdot \Delta nac <$ 200 nm.

In yet another preferred embodiment, a retardation of the first uniaxial optical compensator, which is given by $d1 \cdot \Delta nac$ (where $\Delta nac = nc-na$ and d1 is the thickness of the first uniaxial optical compensator), preferably satisfies 400 nm $< -d1 \cdot \Delta nac <$ 700 nm.

In yet another preferred embodiment, the optical display system may have three liquid crystal panels including the at least one liquid crystal panel. In that case, the light source preferably emits three light rays in three colors falling within mutually different wavelength ranges. The light rays in the three colors are preferably incident onto, and modulated by, the three liquid crystal panels, respectively.

In an alternative preferred embodiment, the optical display system may include no liquid crystal panels but the at least one liquid crystal panel. In that case, the light source preferably emits three light rays in three colors falling within mutually different wavelength ranges. The light rays in the three colors are preferably incident onto the liquid crystal panel at mutually different angles, and are preferably modulated by the liquid crystal panel.

In still another preferred embodiment, a normal to the major surface of the at least one liquid crystal panel preferably defines a tilt angle $\psi$ of 1 degree to 15 degrees with respect to the optical axis of a principal light ray that has been emitted from the light source.

In yet another preferred embodiment, the projection optical system preferably includes a projection lens with an F value of less than 1.8.

In yet another preferred embodiment, the optical display system preferably further includes: a circuit for generating data representing multiple subframes from data representing a frame of an image to be formed by the projection optical system on a projection plane and getting the multiple subframes displayed on the liquid crystal panel one after another time-sequentially; and an optical shifter for optically displacing, on the projection plane, selected ones of the multiple subframes being displayed on the liquid crystal panel.

In this particular preferred embodiment, the optical shifter preferably includes at least one shifting section that periodically displaces the optical axis of incoming light that has been incident on the shifting section. The shifting section preferably includes a first liquid crystal cell, which changes the polarization direction of the incoming light from a first direction into a second direction, or vice versa, in response to a first voltage being applied to a liquid crystal layer of the first liquid crystal cell. The first and second directions are perpendicular to each other. The shifting section preferably further includes: a second liquid crystal cell, which changes the polarization direction of the light that has been transmitted through the liquid crystal layer of the first liquid crystal cell from the first direction into the second direction, or vice versa, in response to a second voltage being applied to a liquid crystal layer of the second liquid crystal cell; and a birefringent element, which changes its refractive indices according to the polarization direction of the light. The first liquid crystal cell, the second liquid crystal cell and the birefringent element are arranged such that the incoming light enters the first liquid crystal cell first, is transmitted through the second liquid crystal cell next, and then leaves the second liquid crystal cell. The first and second liquid crystal cells are preferably arranged such that a director in an intermediate portion of the liquid crystal layer of the first liquid crystal cell and a director in an intermediate portion of the liquid crystal layer of the second liquid crystal cell cross each other at right angles.

In this particular preferred embodiment, the liquid crystal layers of the first and second liquid crystal cells may be made of TN mode liquid crystal materials having mutually opposite optical rotatory directions.

In an alternative preferred embodiment, the liquid crystal layers of the first and second liquid crystal cells may be made of ECB mode liquid crystal materials.

In another preferred embodiment, the optical display system may further include at least one more shifting section that has the same structure and function as the shifting section.

In yet another preferred embodiment, the liquid crystal panel preferably further includes a second uniaxial optical compensator between the liquid crystal layer and the second biaxial optical compensator.

In this particular preferred embodiment, if the index ellipsoid of the second uniaxial optical compensator has a, b and c axes as principal axes and if principal refractive indices on the a, b and c axes are na, nb and nc, respectively, the c axis is preferably substantially parallel to a normal to the major surface of the second uniaxial optical compensator, the a and b axes are preferably defined on the major surface of the second uniaxial optical compensator, and na=nb>nc is preferably satisfied.

In another preferred embodiment, the c axis of the second uniaxial optical compensator preferably defines a tilt angle θ with respect to the normal to the major surface.

Specifically, the tilt angle θ defined by the c axis of the second uniaxial optical compensator with respect to the normal to the major surface is preferably greater than 1 degree but smaller than 20 degrees.

In still another preferred embodiment, a total retardation of the first and second uniaxial optical compensators, which is given by $d1'·\Delta nac$ (where $\Delta nac=nc-na$ and $d1'$ is the total thickness of the first and second uniaxial optical compensators), preferably satisfies 400 nm<−$d1'·\Delta nac$<700 nm.

In yet another preferred embodiment, a retardation of each of the first and second uniaxial optical compensators, which is given by $d1·\Delta nac$ (where $\Delta nac=nc-na$ and $d1$ is the thickness of the first or second uniaxial optical compensator), preferably satisfies 100 nm<−$d1·\Delta nac$<400 nm.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
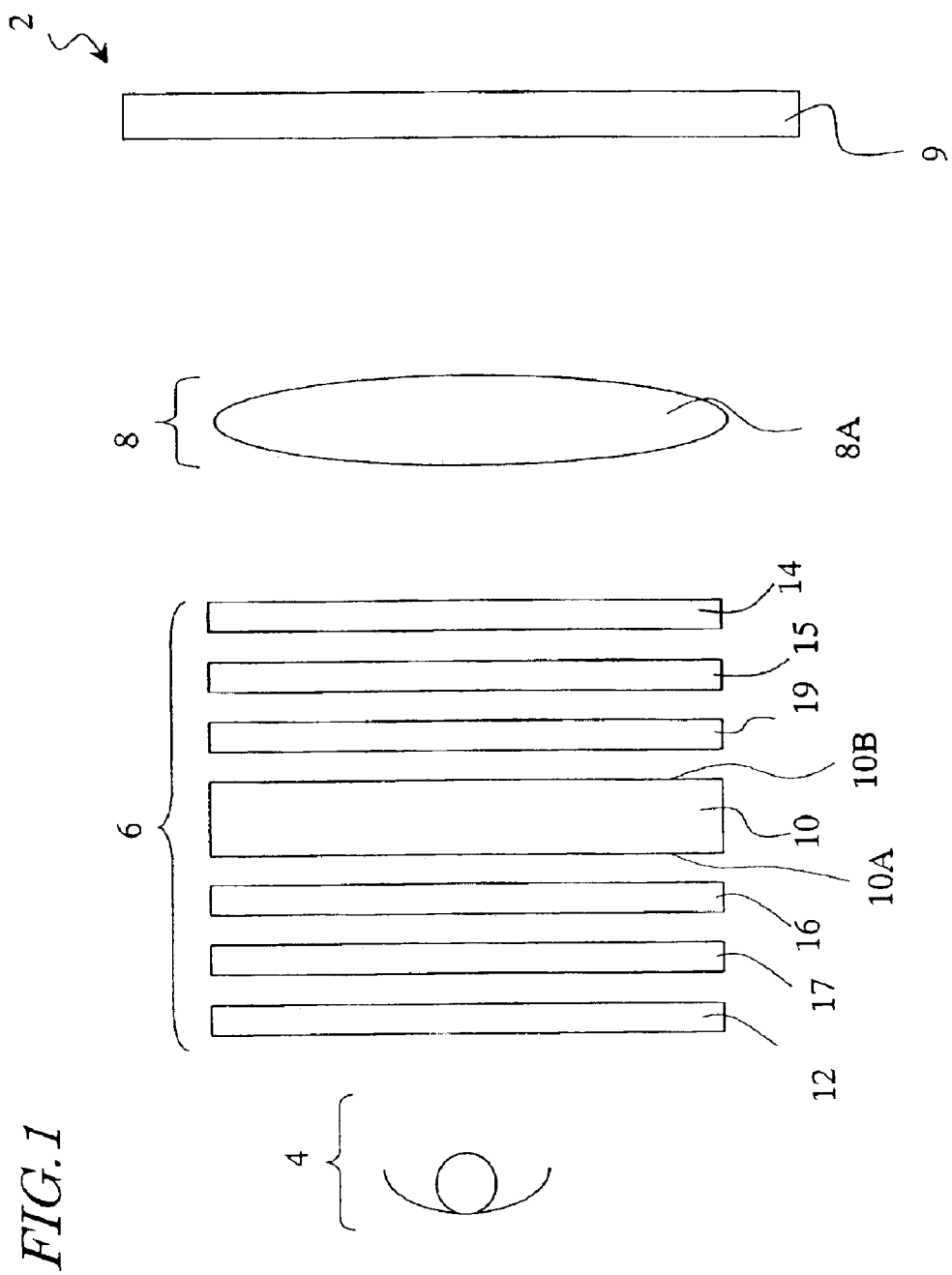
FIG. 1 is a schematic representation of a projection type optical display system according to a preferred embodiment of the present invention.

Hereinafter, a preferred embodiment of the present invention will be described with reference to FIG. 1. FIG. 1 is a schematic representation of a projection type optical display system 2 according to a preferred embodiment of the present invention.

As shown in FIG. 1, the projection type optical display system 2 includes: a light source 4 at least one liquid crystal panel 6 for modulating the light, emitted from the light source 4, in accordance with an image signal; and a projection optical system 8 for projecting the light, which has gone out of the liquid crystal panel 6, onto a screen 9 to form an image thereon.

The liquid crystal panel 6 includes a liquid crystal layer 10, a first polarizer 12, a second polarizer 14, a first uniaxial optical compensator 16, a first biaxial optical compensator 17, a second uniaxial optical compensator 19 and a second biaxial optical compensator 15. The first polarizer 12 is provided so as to face the light incoming plane 10A of the liquid crystal layer 10, while the second polarizer 14 is provided so as to face the light outgoing plane 10B of the liquid crystal layer 10. The first uniaxial optical compensator 16 is provided between the liquid crystal layer 10 and the first polarizer 12. The first biaxial optical compensator 17 is provided between the first uniaxial optical compensator 16 and the first polarizer 12. The second uniaxial optical compensator 19 is provided between the liquid crystal layer 10 and the second polarizer 14. The second biaxial optical compensator 15 is provided between the second uniaxial optical compensator 19 and the second polarizer 14.

The liquid crystal panel 6 shown in FIG. 1 includes a pair of uniaxial and biaxial optical compensators between the liquid crystal layer 10 and the first polarizer 12 and another pair of uniaxial and biaxial optical compensators between the liquid crystal layer 10 and the second polarizer 14. However, the second uniaxial optical compensator 19 may be omitted from the second pair between the liquid crystal layer 10 and the second polarizer 14.

As used herein, the "light incoming plane" 10A of the liquid crystal layer 10 refers to one of the two opposed major surfaces 10A and 10B of the liquid crystal layer 10 that receives the light that has been emitted from the light source 4. On the other hand, the "light outgoing plane" 10B of the liquid crystal layer 10 refers to the other major surface that is opposed to the light incoming plane 10A and that passes the light that has been transmitted through the liquid crystal layer 10.

The liquid crystal panel 6 may be disposed such that a normal to the major surface of the liquid crystal panel 6 becomes parallel to the optical axis of the principal light ray that has been emitted from the light source 4 as shown in FIG. 1. Alternatively, the liquid crystal panel 6 may also be disposed such that a normal to the major surface of the liquid crystal panel 6 defines a tilt angle $\psi$ of about 1 degree to about 15 degrees with respect to the optical axis of the principal light ray. Even so, the resultant contrast ratio is almost as high as the situation where the liquid crystal panel 6 is disposed such that a normal to the major surface of the liquid crystal panel 6 is parallel to the optical axis of the principal light ray that has been emitted from the light source 4 as will be described later for specific preferred embodiments of the present invention.

Next, the optical compensators 15, 16, 17 and 19 of the liquid crystal panel 6 will be described. According to a preferred embodiment of the present invention, the properties of these optical compensators 15, 16, 17 and 19 are optimized for the liquid crystal panel 6, thereby providing a projection type optical display system that achieves a higher contrast ratio and a brighter image than a conventional one.

Figure 2:
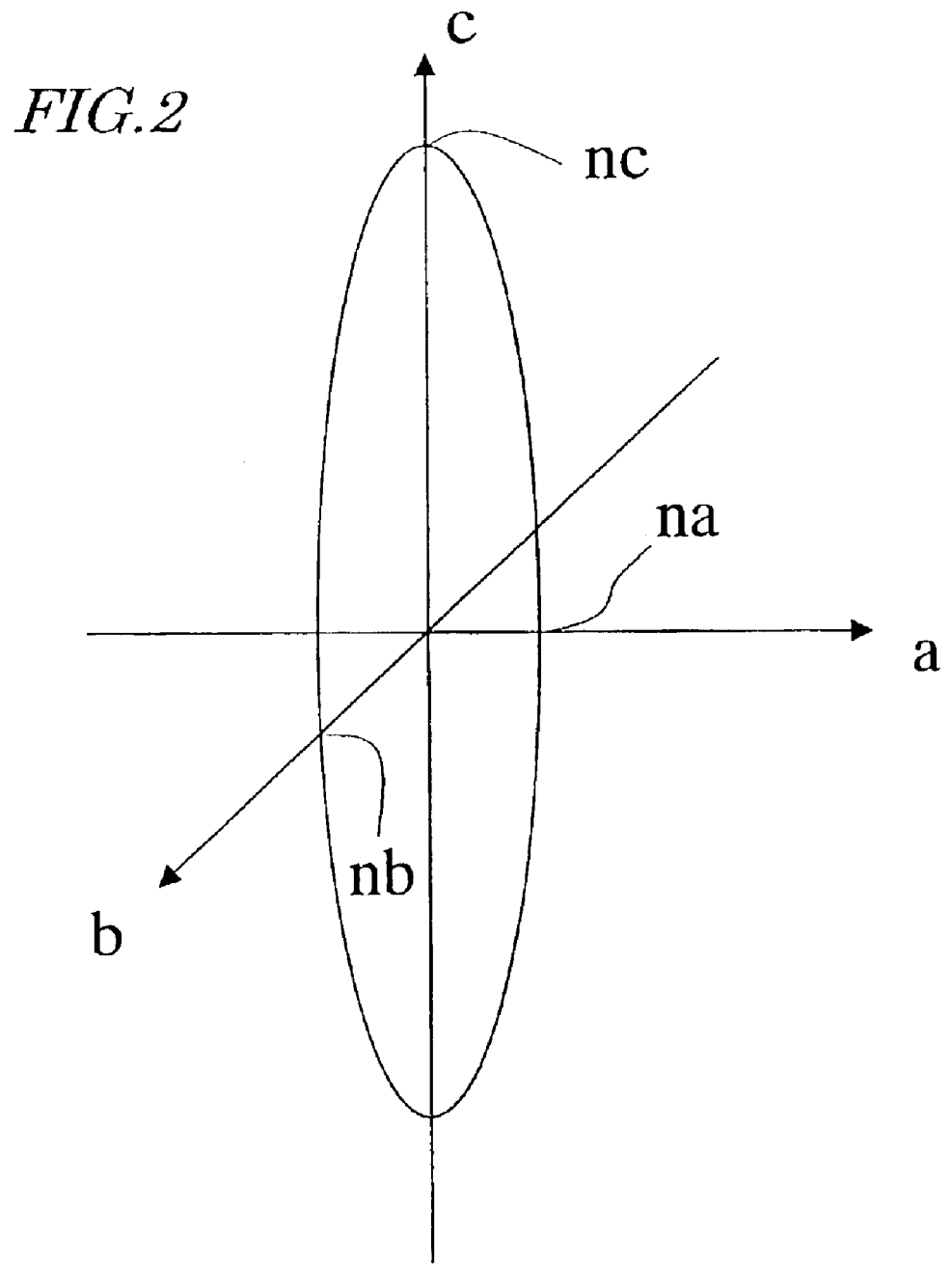
FIG. 2 shows the index ellipsoid of an optical compensator.
Figure 3:
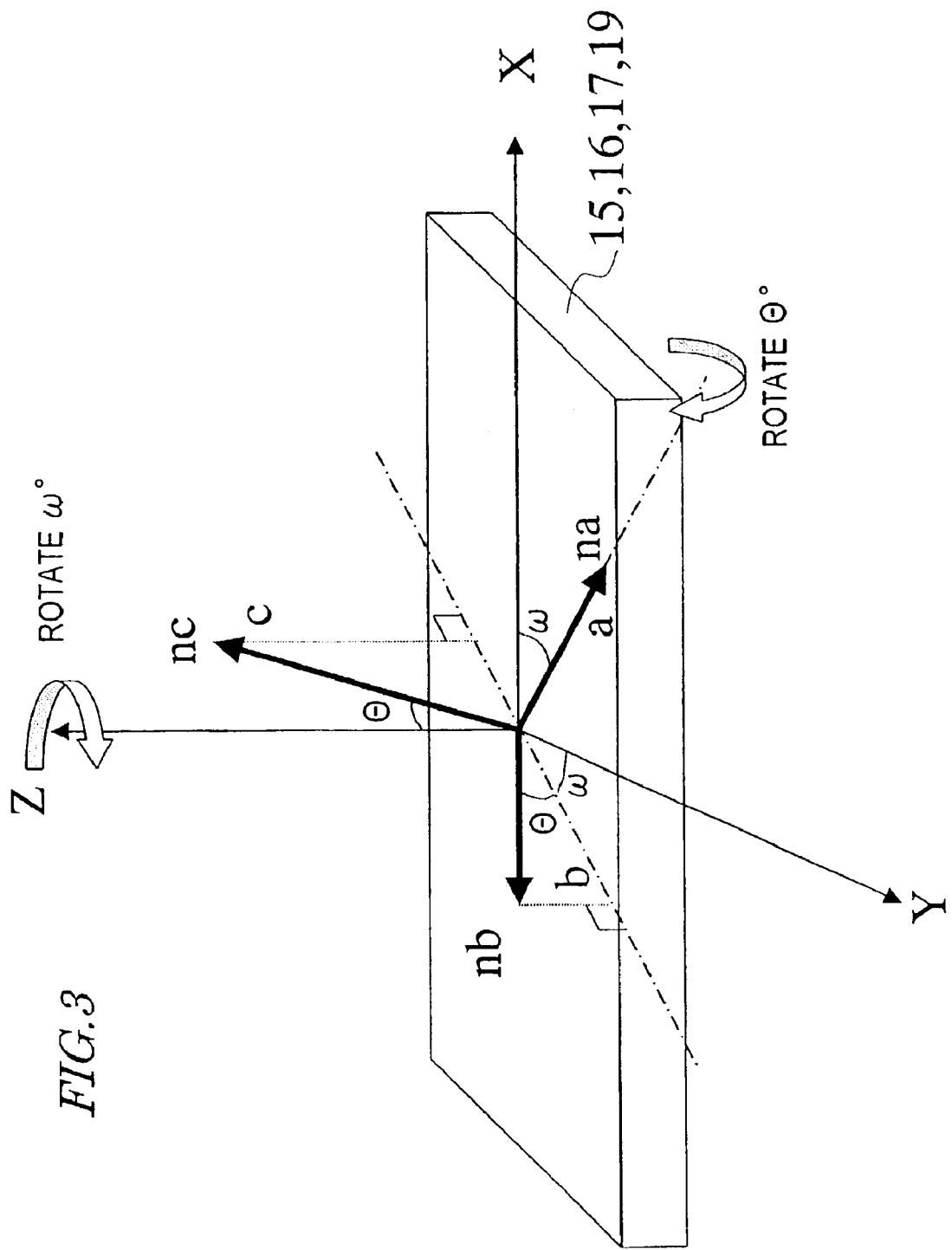
FIG. 3 schematically shows a positional relationship between an optical compensator and the index ellipsoid of the optical compensator.

Each of these optical compensators 15, 16, 17 and 19 is provided with optical anisotropy by aligning orientation directions of polymer chains within a plane of a polymer film (corresponding to the XY plane of the optical compensator 15, 16, 17 or 19 shown in FIG. 3). The aligning process may be carried out by the polymer film, for example. FIG. 2 schematically shows what the index ellipsoid of the optical compensator 15, 16, 17 or 19 is. In FIG. 2, the principal axes of the index ellipsoid are supposed to be a, b and c axes, which have principal refractive indices na, nb and nc, respectively.

In each of the biaxial optical compensators 15 and 17, the c axis of the index ellipsoid thereof is preferably substantially parallel to a normal to the major surface of the biaxial optical compensator, the a and b axes thereof preferably are defined on the major surface of the biaxial optical compensator, and the principal refractive indices thereof preferably satisfy the inequality nb>nc>na.

A pair of polarizers, of which the polarization axes cross each other at right angles, does not transmit light that has been incident along a normal to the polarizers but slightly transmits light that has been incident in a direction that defines a tilt angle with respect to the normal, thus causing leakage of light. This is because as viewed from the direction that defines some tilt angle with respect to the normal to the polarizers, the polarization axes of the polarizers do not cross each other at right angles.

However, if the principal refractive indices of the biaxial optical compensators satisfy the inequality described above, then the leakage of light can be minimized in the direction that defines some tilt angle with a normal to the polarizers.

On the other hand, in each of the uniaxial optical compensators 16 and 19, the c axis of the index ellipsoid thereof is preferably substantially parallel to a normal to the major surface of the uniaxial optical compensator, the a and b axes thereof preferably define the major surface of the uniaxial optical compensator, and the principal refractive indices thereof preferably satisfy the inequality na=nb>nc. If the principal refractive indices of the uniaxial optical compensator satisfy this inequality, then the retardation of a liquid crystal layer, in which liquid crystal molecules are aligned vertically, can be compensated for. Thus, the unwanted leakage of light, caused by the light that has been incident in a direction defining a tilt angle with the normal to the display plane, can be minimized.

In the example described above, in each of the uniaxial and biaxial optical compensators 16, 19, 15 and 17, the index ellipsoid thereof has a c axis that is substantially parallel to the normal to the major surface of the optical compensator and a and b axes that define the major surface. However, according to preferred embodiments of the present invention, preferred optical compensators are not limited to the exemplified ones. Thus, the c axis of the index ellipsoid may define a tilt angle with respect to the Z axis (i.e., a normal to the major surface) of the optical compensator.

Such an optical compensator, having an index ellipsoid of which the c axis defines a tilt angle with respect to the Z axis of the optical compensator, will be described with reference to FIG. 3. FIG. 3 schematically shows a positional relationship between the optical compensator 15, 16, 17 or 19 and the index ellipsoid thereof.

Suppose an orthogonal coordinate system, in which the major surface of the optical compensators 15, 16, 17 and 19 is an XY plane and a normal to the major surface of the optical compensators 15, 16, 17 and 19 is a Z axis, is defined as shown in FIG. 3. The index ellipsoid shown in FIG. 3 is obtained by rotating the index ellipsoid shown in FIG. 2 (of which the a, b and c axes match the X, Y and Z axes, respectively) clockwise to an angle ω around the c axis first and then rotating it clockwise to an angle θ around the a axis.

The tilted principal axis of an optical compensator will be defined herein by the azimuth angle ω and the tilt angle θ.

It should be noted that the X axis is supposed to define the horizontal direction of the image displayed, i.e., a direction that equally divides the angle defined by the transmission axes of two crossed-Nicol polarizers.

The tilt angle θ that is defined by the c axis of the index ellipsoid of the uniaxial or biaxial optical compensator with respect to the normal to the major surface of the optical compensator (i.e., the Z axis) is preferably greater than about 1 degree but smaller than about 20 degrees.

For example, when a voltage is applied to a liquid crystal layer, not all of the liquid crystal molecules thereof are aligned exactly vertically but some of them are aligned so as to define some tilt angle with respect to the vertical direction. The optical compensator, having an index ellipsoid of which the c axis defines some tilt angle with respect to the Z axis of the optical compensator, can compensate for the retardation of those liquid crystal molecules that are aligned so as to define some tilt angle with respect to the vertical direction. As a result, the projection type optical display system ensures a higher contrast ratio.

Also, when the principal refractive indices na, nb and nc satisfy the inequality nb>nc>na in each of the biaxial optical compensators 15 and 17, the total retardation of the biaxial optical compensators 15 and 17, which is given by d2$^t$·Δnab (where Δnab=nb−na and d2$^t$ is the total thickness of the biaxial optical compensators 15 and 17), preferably satisfies 200 nm<d2$^t$·Δnab<400 nm, and the other total retardation of the biaxial optical compensators 15 and 17, which is given by d2$^t$·Δnac (where Δnac=nc−na), preferably satisfies 100 nm<d2$^t$·Δnac<200 nm. In this case, the retardation of the liquid crystal layer is preferably defined by 350 nm≦d·Δn≦500 nm, where d is the thickness of the liquid crystal layer and Δn is the anisotropic refractive index of the liquid crystal material.

It should be noted that when three or more biaxial optical compensators are used, the sum of retardations of those compensators preferably satisfies the range defined above.

Also, when the principal refractive indices na, nb and nc satisfy the inequality na=nb>nc in each of the uniaxial optical compensators 16 and 19, the total retardation of the uniaxial optical compensators 16 and 19, which is given by d1$^t$·Δnac (where Δnac=nc−na and d1$^t$ is the total thickness of the uniaxial optical compensators 16 and 19), preferably satisfies 400 nm<−d1$^t$·Δnac<700 nm. It should be noted that if the uniaxial optical compensator 16, facing the light incoming plane 10A of the liquid crystal layer 10, has a retardation that satisfies this inequality, then the uniaxial optical compensator 19, facing the light outgoing plane 10B of the liquid crystal layer 10, may be omitted. In this case, the retardation of the liquid crystal layer is preferably defined by 350 nm≦d·Δn≦500 nm, where d is the thickness of the liquid crystal layer and Δn is the anisotropic refractive index of the liquid crystal material. It should be noted that when two or more uniaxial optical compensators are used, the sum of retardations of those compensators preferably satisfies the range defined above. Also, if three or more uniaxial optical compensators are used, the retardation of each of those uniaxial optical compensators d1·Δnac preferably satisfies 100 nm<−d1·Δnac<400 nm.

The present inventors discovered and confirmed via simulations (or computations) that when the retardations d2·Δnab and d2·Δnac of the biaxial optical compensator and the retardation d1·Δnac of the uniaxial optical compensator satisfied the ranges defined above, the projection type optical display system ensured an increased contrast ratio. This is believed to be because when the retardations satisfied those ranges, the unwanted leakage of light could be minimized in the direction that defined some tilt angle with respect to the normal to the major surface of the optical compensator and the unintentional transmission of light due to a residual retardation in a liquid crystal layer while a voltage was applied thereto (i.e., in black display mode) could also be minimized.

In the projection type optical display system according to the preferred embodiment described above, the types of the optical compensators of the liquid crystal panel, the principal axis directions of the index ellipsoid, and the refractive indices are optimized. Accordingly, even if incoming light enters a liquid crystal layer at a relatively large angle of incidence during a black display mode thereof, the retardation of the liquid crystal layer can be compensated for, the unwanted leakage of light can be minimized, and the decrease in contrast ratio can also be minimized. Thus, the projection lens 8A of the projection optical system 8 may be a lens with an F value of less than 1.8. As a result, the projection type optical display system achieves the display of a brighter image.

The projection type optical display system 2 of this preferred embodiment realizes a display operation in full colors by adopting one of the following two arrangements, i.e., either three-panel arrangement or single-panel arrangement.

The three-panel projection type optical display system (such as that shown in FIG. 4) includes three liquid crystal panels 6. Three color rays falling within mutually different wavelength ranges, which have been emitted from the light source 4 (which is typically a white light source), are incident onto, and modulated by, their associated liquid crystal panels 6. The three color rays falling within mutually different wavelength ranges are typically red (R), green (G) and blue (B) light rays. After leaving the liquid crystal panels 6, those three color rays are synthesized together by the projection lens 8A of the projection optical system 8 so as to be projected onto the screen (i.e., projection plane) 9.

On the other hand, the single-panel projection type optical display system (such as that shown in FIG. 15) includes just one liquid crystal panels 6. Three color rays falling within mutually different wavelength ranges, which have been emitted from the light source (which is typically a white light source) 4, are incident onto the same liquid crystal panel 6 at mutually different angles and are modulated by the same liquid crystal panels 6. After leaving the liquid crystal panel 6, those three color rays are synthesized together by the projection lens 8A of the projection optical system 8 so as to be projected onto the screen (i.e., projection plane) 9.

It should be noted that the light source 4 does not have to be a white light source but three different LED light sources, for example, may be used for the three different colors. In the preferred embodiments of the present invention to be described later, the light sources 101 and 201 are supposed to be white light sources. However, when three light sources for R, G and B light rays are used, the color separation optical system 1100 or 2100 may be omitted.

In the projection type optical display system according to the preferred embodiment described above, the optical compensators of the liquid crystal panel are optimized. Thus, the optical display system can display a bright image at an increased contrast ratio.

The projection type optical display system of this preferred embodiment can also be used effectively in a projection type optical display system including an optical shifter (see Japanese Laid-Open Publication No. 2001-356316, for example). Hereinafter, a projection type optical display system including an optical shifter according to another preferred embodiment of the present invention will be described.

The projection type optical display system of this preferred embodiment may be a single-panel projection type optical display system including no color filters, for example. In this optical display system, data representing a plurality of image subframes are generated from data representing each image frame as an image component. Then, the image subframes are displayed by a liquid crystal panel time-sequentially. Thereafter, by sequentially shifting these image subframes on a screen (i.e., projection plane), the same area on the screen is sequentially irradiated with multiple light rays that have been modulated by mutually different pixel regions of the liquid crystal panel and that fall within respectively different wavelength ranges (which will be referred to herein as "R, G and B light rays"), thereby realizing a high-resolution full-color display.

For example, take a particular area on the screen, which corresponds to one pixel. In the projection type optical display system including the optical shifter, the particular area may be irradiated with a red (R) light ray in a period during which a subframe is being displayed (which period will be referred to herein as a "subframe period"). In that case, the particular area may be irradiated with a green (G) light ray in the next subframe period and with a blue (B) light ray in the following subframe period, respectively. In this manner, in the projection type optical display system 2 including an optical shifter, the color of each pixel on the screen is defined by the time-sequential irradiation of the R, G and B light rays.

As will be described in detail later, each image subframe is formed by combining the R, G and B light rays with each other. That is to say, in a subframe period, the projection plane is irradiated with the R, G and B light rays that have been modulated by the liquid crystal panel. Each of the R, G and B light rays that have been modulated by the liquid crystal panel irradiates one position on the screen in one subframe period but irradiates another position on the screen in the next subframe period. Then, those light rays are synthesized together with time, thereby displaying a full-color image frame thereon. Such a time-sequential synthesis of the R, G and B light rays is performed by an optical shifter. The optical shifter is provided between the liquid crystal panel and the screen to change the optical path of the light ray, which has been modulated by the liquid crystal panel, periodically and regularly.

Figure 18:
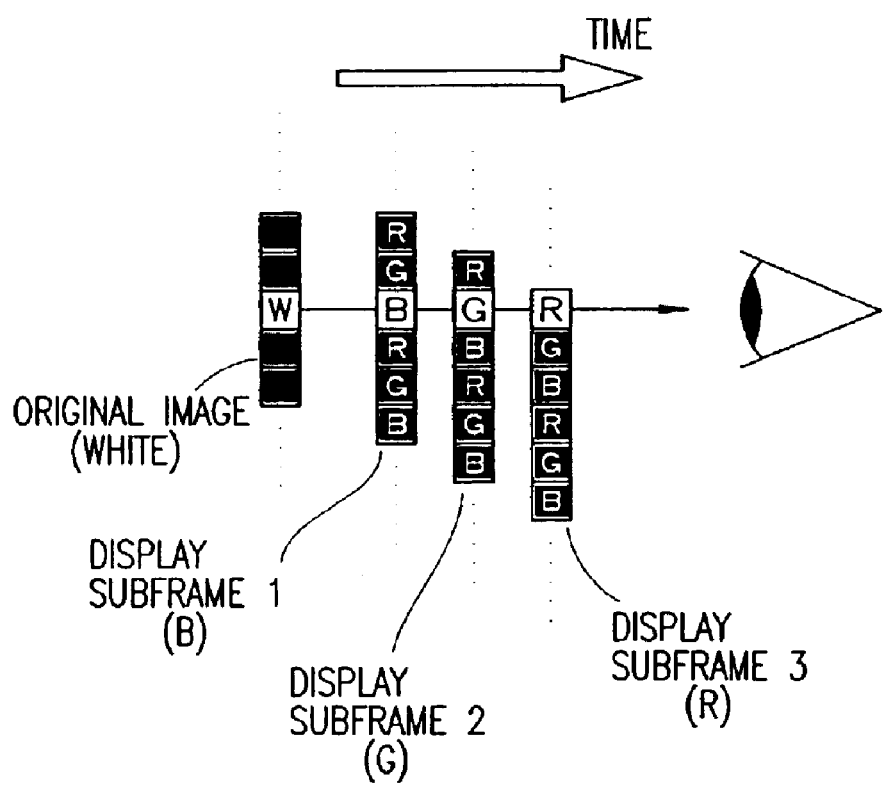
FIG. 18 schematically shows how image components may be displaced.

FIG. 18 schematically shows how the optical shifter sequentially displaces multiple image subframes vertically with time. As shown in FIG. 18, the optical shifter displaces one of multiple image subframes after another in one direction (vertically in the example illustrated in FIG. 18 but may also be horizontally) at a pitch of one pixel. Thus, the same pixel area on the screen is irradiated with the B, G, R, B, G and R light rays time-sequentially, for example. By adopting such an arrangement, even the single-panel type can achieve as high a resolution as a three-panel projection type optical display system.

In a conventional single-panel projection type optical display system including no optical compensators, when incoming light enters a liquid crystal panel from a direction that defines some tilt angle with a normal to the major surface of the liquid crystal panel, leakage of light is inevitable. In that case, even if the R, G and B light rays are synthesized together with time by the optical shifter, the color balance among the outgoing R, G and B light rays will be disturbed, thus possibly creating color unevenness. In contrast, in the projection type optical display system including the optical shifter according to this preferred embodiment, the liquid crystal panel thereof includes predetermined optical compensators, thus minimizing the color unevenness and realizing the display of a quality image.

Figure 19:
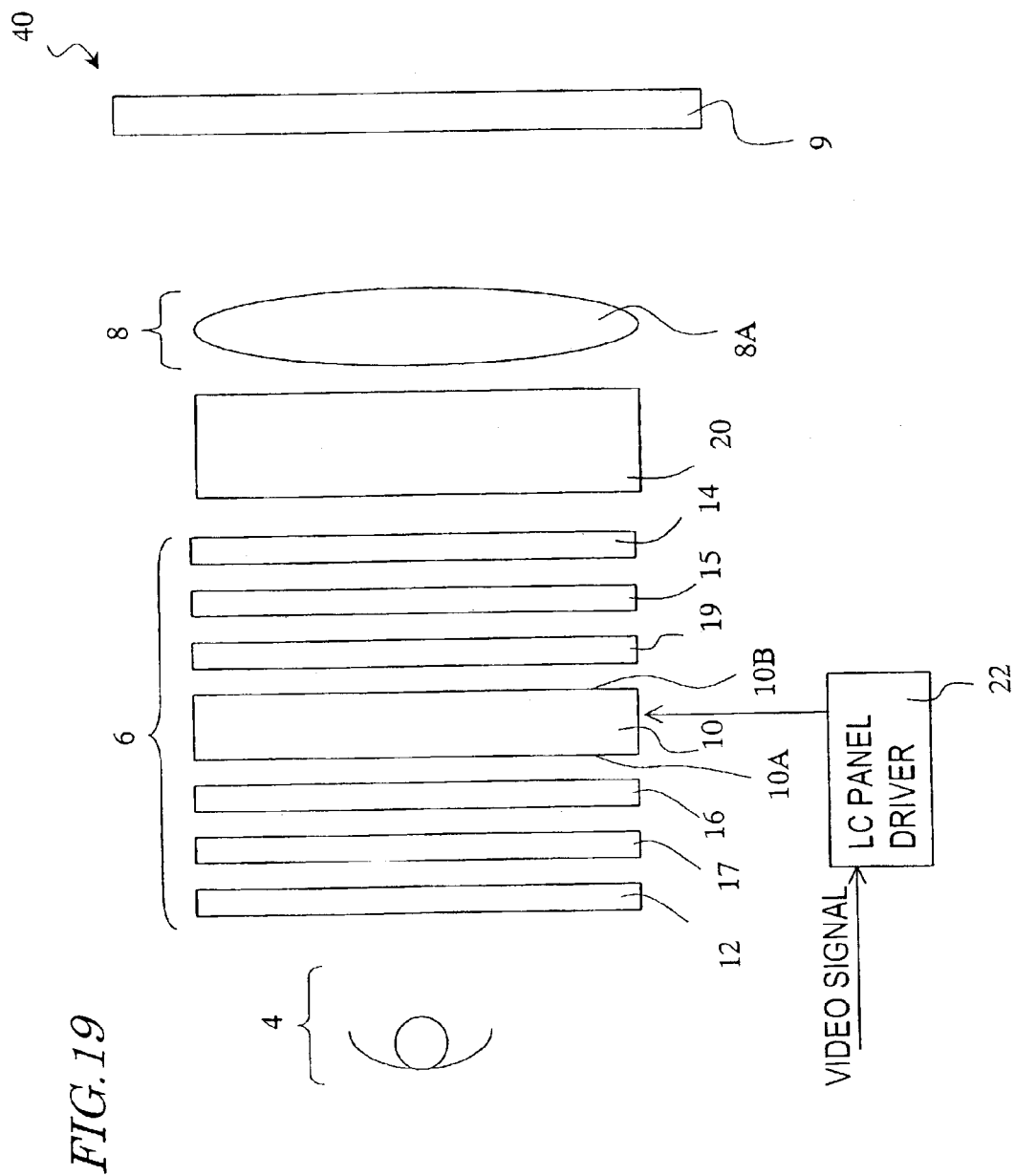
FIG. 19 is a schematic representation of a projection type optical display system according to another preferred embodiment of the present invention.

Hereinafter, specific examples of such a projection type optical display system including an optical shifter will be described with reference to the accompanying drawings. FIG. 19 schematically shows the arrangement of such a projection type optical display system 40 including an optical shifter.

As shown in FIG. 19, the projection type optical display system 40 includes not only all of the members of the projection type optical display system 2 shown in FIG. 1 but also an optical shifter 20 as well. In each of these two projection type optical display systems 2 and 40 shown in FIGS. 1 and 19, a driver circuit 22, which supplies a drive signal or a video signal to the liquid crystal panel 6, is connected to the liquid crystal panel 6 (although not shown in FIG. 1). Thus, the liquid crystal panel 6 can display thereon an image of which the contents are represented by the video signal. This projection type optical display system 40 is characterized by getting data representing multiple image subframes generated by the driver circuit 22 from data representing each frame of the image to be formed by the projection optical system 8 onto the screen 9 and by getting those image subframes displayed time-sequentially on the liquid crystal panels 6. The optical shifter 20 displaces, on the screen 9, selected one of the image subframes that are displayed on the liquid crystal panel 6.

Figure 20:
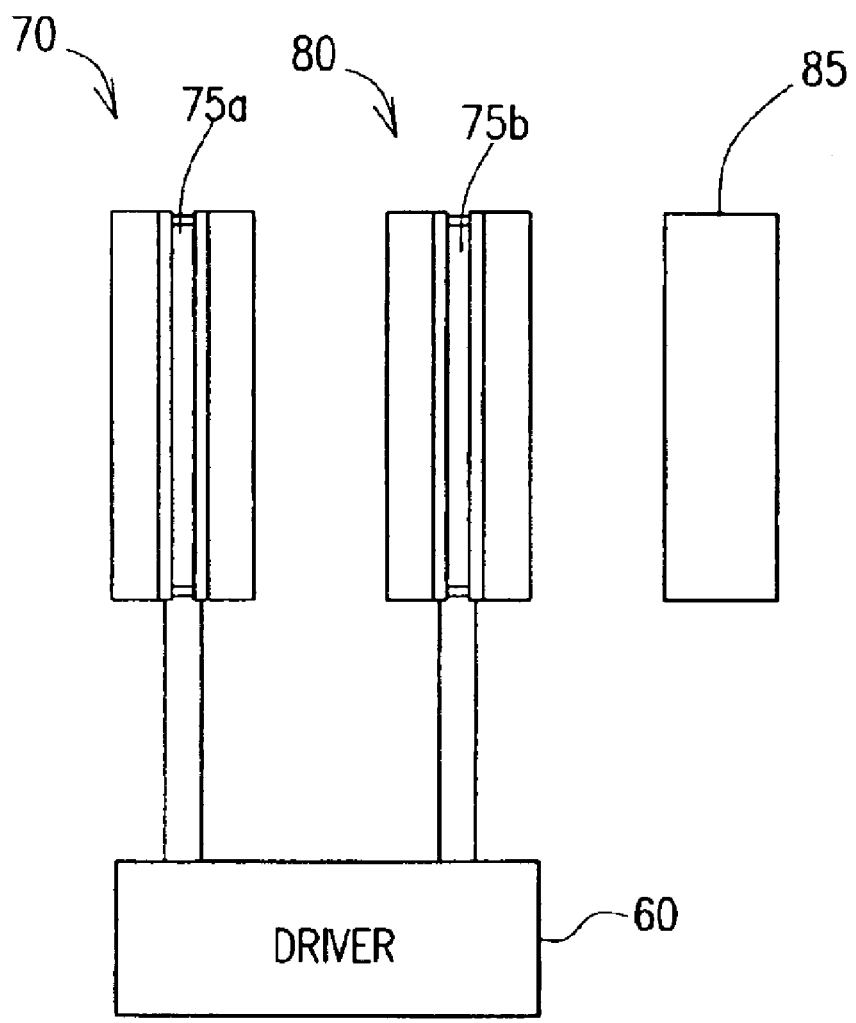
FIG. 20 shows an exemplary optical shifter.

Hereinafter, an exemplary optical shifter 20 will be described with reference to FIG. 20. In the following example, the optical shifter 20 is supposed to include at least two liquid crystal cells and one birefringent element. However, as long as selected ones of the image subframes being displayed on the liquid crystal panel 6 can be shifted on the screen, any of various known optical shifters may also be used. Nevertheless, the optical shifter 20 preferably has the arrangement shown in FIG. 20 to realize the display of a quality image. This is because an unwanted ghost image or inappropriate optical shifting due to the residual optical rotatory dispersion of the liquid crystal cells can be minimized in the arrangement shown in FIG. 20.

The optical shifter 20 includes at least one shifting section that periodically displaces the optical axis of incoming linearly polarized light that has been incident on the shifting section. As shown in FIG. 20, the shifting section includes a first liquid crystal cell 70, a second liquid crystal cell 80 and a birefringent element 85. The first liquid crystal cell 70 can change the polarization direction of the incoming light from one of two mutually perpendicular directions into the other depending on whether the voltage being applied from a driver circuit 60 to the first liquid crystal cell 70 is high or low. Just like the first liquid crystal cell 70, the second liquid crystal cell 80 can also change the polarization direction of the incoming light from one of the two mutually perpendicular directions into the other depending on whether the voltage being applied from the driver circuit 60 to the second liquid crystal cell 80 is high or low.

The first liquid crystal cell 70, second liquid crystal cell 80 and birefringent element 85 are arranged so as to transmit the incoming light in this order. The first and second liquid crystal cells 70 and 80 are arranged such that a director (i.e., a vector representing the typical orientation direction of liquid crystal molecules) in an intermediate portion of the liquid crystal layer 75a of the first liquid crystal cell 70 and a director in an intermediate portion of the liquid crystal layer 75b of the second liquid crystal cell 80 cross each other at right angles. As used herein, the "intermediate portion" of a liquid crystal layer refers to a portion of the liquid crystal layer that is located around the center of the thickness of the liquid crystal layer.

In this optical shifter 20, the pair of liquid crystal cells 70 and 80 the directors of which cross each other at right angles, is provided in front of the birefringent element 85. Thus, the unwanted polarized components that are produced in one of the two liquid crystal layers are canceled by the polarized components that are produced in the other liquid crystal layer. In this manner, any disturbance in polarization can be compensated for. As a result, desired linearly polarized light can be obtained and the ghost image can be substantially eliminated.

As used herein, where the light that has been transmitted through a liquid crystal layer may be in one of two mutually different states (i.e., a plane of polarization of the outgoing light in one state may cross that of the outgoing light in the other state at right angles) depending on whether the voltage being applied to the liquid crystal layer is high or low, the liquid crystal layer (or liquid crystal cell) to which the high voltage is being applied and which is ready to output predetermined linearly polarized light is regarded as being "in ON state". On the other hand, if the magnitude (or absolute value) of the voltage applied to the liquid crystal layer is much smaller than that of the voltage that needs to be applied to turn the liquid crystal layer ON and if polarized light having a plane of polarization, which substantially crosses that of the polarized light outgoing from the ON-state liquid crystal layer at right angles, is going out of the liquid crystal layer, the liquid crystal layer (or liquid crystal cell) is regarded herein as being "in OFF state". To "turn OFF" the liquid crystal layer, the low voltage to be applied to the liquid crystal layer may be decreased to zero volts. Alternatively, the liquid crystal layer may also be "turned OFF" by being supplied with a non-zero voltage (e.g., 2.5 volts) as an offset voltage.

As used herein, the "high voltage" applied is a voltage that is high enough to. "turn ON" the liquid crystal layer, while the "low voltage" applied is a voltage that is low enough to "turn OFF" the liquid crystal layer. If a TN mode liquid. crystal material having positive dielectric anisotropy $\Delta \epsilon$ is used, then the liquid crystal molecules are aligned with the direction of the electric field while the liquid crystal layer is in "ON state", but are twisted by about 90 degrees while the liquid crystal layer is in "OFF state". On the other hand, if a TN mode liquid crystal material having negative dielectric anisotropy $\Delta \in$ is used, then the liquid crystal molecules are twisted by about 90 degrees while the liquid crystal layer is in "ON state", but are aligned in one direction while the liquid crystal layer is in "OFF state". In the following preferred embodiments, the present invention will be described as using a liquid crystal material having positive dielectric anisotropy $\Delta \in$. It should be understood, however, that the present invention can also be carried out even if a liquid crystal material having negative dielectric anisotropy $\Delta \in$ is used.

The projection type optical display system including the optical shifter can display a bright image at a high contrast ratio and in full colors at a high resolution.

Hereinafter, specific preferred embodiments of the present invention will be described with reference to the accompanying drawings.

Embodiment 1

Figure 4:
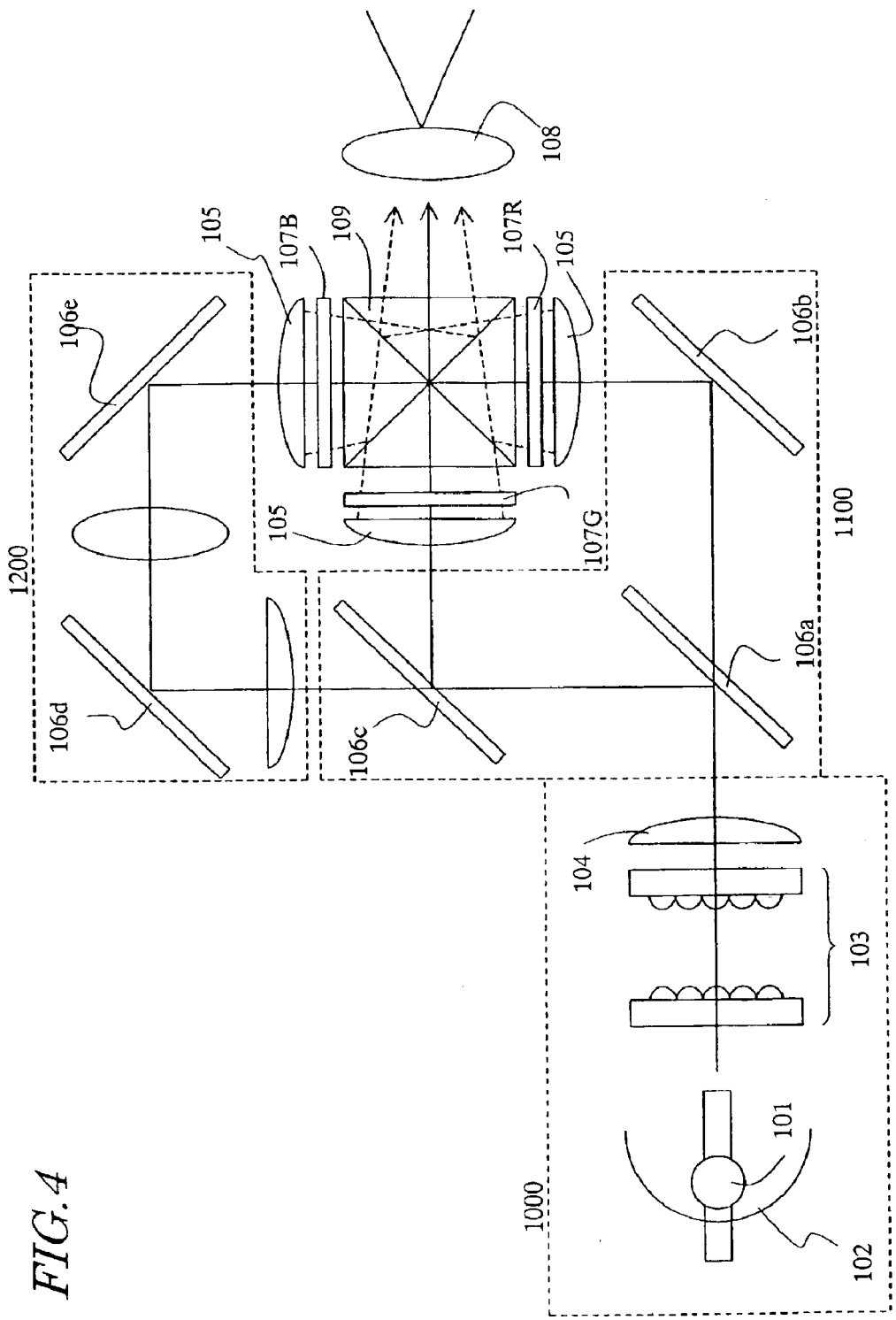
FIG. 4 is a schematic representation of a three-panel projection type optical display system according to a first specific preferred embodiment of the present invention.

FIG. 4 is a schematic representation of a three-panel projection type optical display system according to a first specific preferred embodiment of the present invention.

As shown in FIG. 4, the three-panel projection type optical display system of the first preferred embodiment includes an illumination optical system 1000, a color separation optical system 1100, a relay optical system 1200, three liquid crystal panels 107R, 107G and 107B, three field lenses 105 provided for the respective panels 107R, 107G and 107B, a dichroic prism 109 and a projection lens 108.

The illumination optical system 1000 includes a light source 101, a reflector 102, lens arrays 103 and a condenser lens 104. The color separation optical system 1100 includes dichroic mirrors 106a and 106c and a reflective mirror 106b. The relay optical system 1200 includes reflective mirrors 106d and 106e.

The white light, which has been emitted from the light source 101 of the illumination optical system 1000, is separated by the dichroic mirrors 106a and 106c of the color separation optical system 1100 into R, G and B light rays. After having their propagation directions appropriately adjusted by the reflective mirrors 106b, 106d and 106e, the R, G and B light rays are incident onto their associated liquid crystal panels 107R, 107G and 107B by way of the respective field lenses 105. Thereafter, those light rays, modulated by their associated liquid crystal panels, leave the panels so as to be synthesized together at the dichroic prism 109. The synthesized light is transmitted through the dichroic prism 109 and then projected by the projection lens 108 onto a screen (not shown) to present an image in full colors there.

Figure 5:
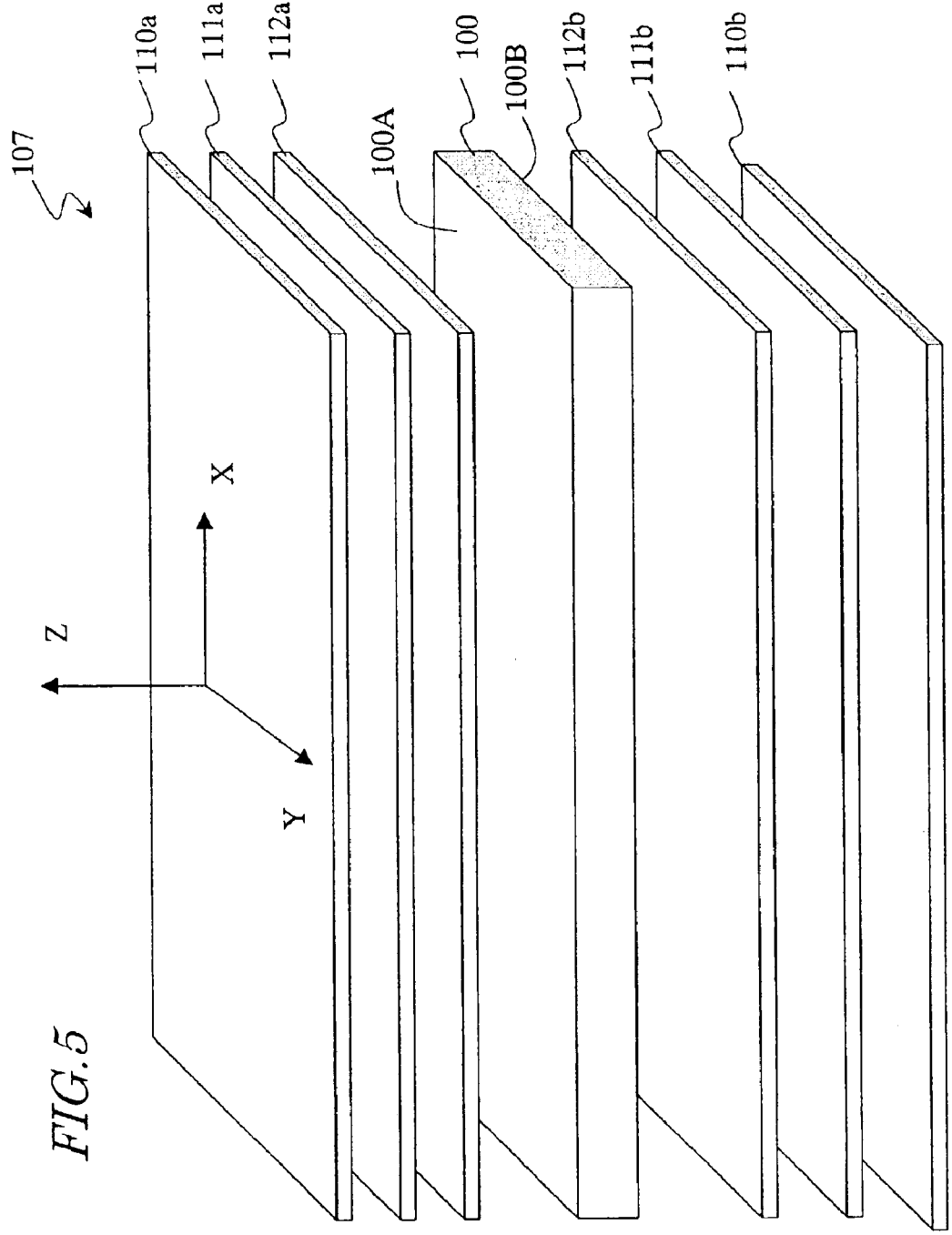
FIG. 5 is a perspective view schematically illustrating the arrangement of respective optical members in the liquid crystal panel 107 shown in FIG. 4.

FIG. 5 is a perspective view schematically illustrating the arrangement of respective optical members in each of the liquid crystal panels 107R, 107G and 107B (all of which will be collectively identified herein by the reference numeral 107 for the sake of simplicity). As shown in FIG. 5, the liquid crystal panel 107 includes a liquid crystal layer 100, a first polarizer 110a, a second polarizer 110b, a first uniaxial optical compensator 112a, a first biaxial optical compensator 111a, a second uniaxial optical compensator 112b and a second biaxial optical compensator 111b. The first polarizer 110a is provided so as to face the light incoming plane 100A of the liquid crystal layer 100, while the second polarizer 10b is provided so as to face the light outgoing plane 100B of the liquid crystal layer 100. The first uniaxial optical compensator 112a is provided between the liquid crystal layer 100 and the first polarizer 110a. The first biaxial optical compensator 111a is provided between the first uniaxial optical compensator 112a and the first polarizer 110a. The second uniaxial optical compensator 112b is provided between the liquid crystal layer 100 and the second polarizer 110b. The second biaxial optical compensator 111b is provided between the second uniaxial optical compensator 112b and the second polarizer 110b.

Each of the uniaxial and biaxial optical compensators 112a, 112b, 111a and 111b is made of an optically anisotropic material in a flat plate shape. As already described with reference to FIG. 2, the refractive indices of the uniaxial and biaxial optical compensators are represented by an index ellipsoid that has a, b and c axes as its principal axes. Specifically, the refractive indices on the a, b and c axes are represented by na, nb and nc, respectively.

Figure 6:
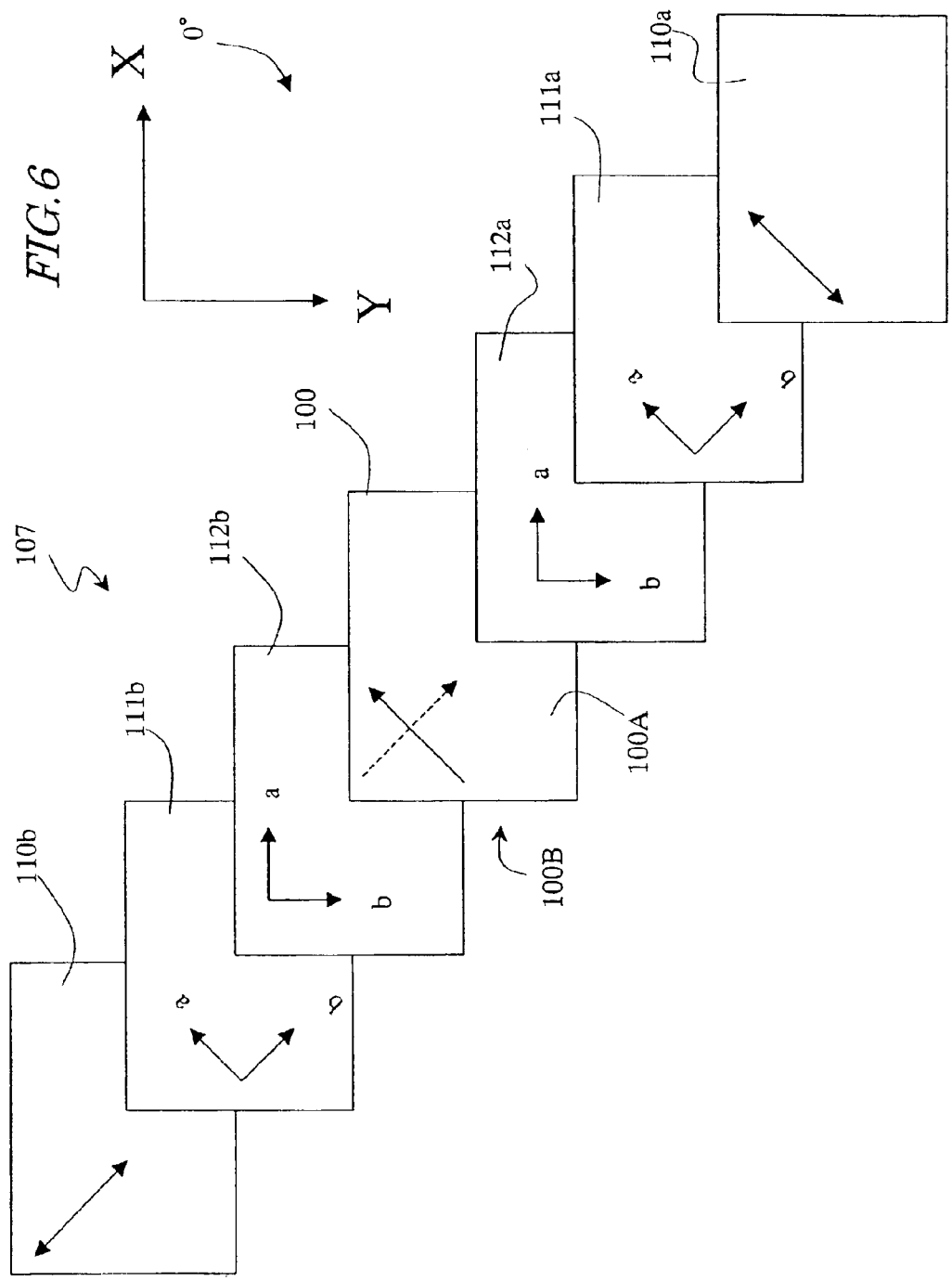
FIG. 6 schematically shows the arrangement of the liquid crystal layer, optical compensators and polarizers shown in FIG. 5.

FIG. 6 schematically shows the arrangement of the liquid crystal layer, optical compensators and polarizers shown in FIG. 5. In FIG. 6, the a and b axes of the index ellipsoid of the optical compensators and the polarization axes (or transmission axes) of the polarizers are indicated by the arrows. It should be noted that the XY plane is defined on the major surface of the optical compensators 111a, 111b, 112a and 112b, polarizers 110a and 110b and liquid crystal layer 100. In this XY plane, the X-axis direction is defined by an azimuth angle ω of zero degrees and a clockwise rotation direction with respect to the X axis is supposed to be positive.

The first polarizer 110a is disposed such that the polarization axis thereof is defined by an azimuth angle ω of 135 degrees (or 315 degrees). On the other hand, the second polarizer 110b is disposed such that the polarization axis thereof is defined by an azimuth angle ω of 45 degrees (or 225 degrees).

The first biaxial optical compensator 111a is disposed such that the a and b axes of the index ellipsoid thereof are defined by azimuth angles ω of 315 degrees and 45 degrees, respectively, and that the c axis of the index ellipsoid thereof is parallel to a normal to the major surface of the first biaxial optical compensator 111a (i.e., parallel to the Z-axis direction or θ=0 degrees).

The first uniaxial optical compensator 112a, adjacent to the first biaxial optical compensator 111a, is disposed such that the a and b axes of the index ellipsoid thereof are defined by azimuth angles ω of 0 degrees and 90 degrees, respectively, and that the c axis of the index ellipsoid thereof defines a tilt angle θ of 2.5 degrees with respect to a normal to the major surface of the first uniaxial optical compensator 112a (i.e., to the Z-axis direction).

The second uniaxial optical compensator 112b, which is disposed so as to face the first uniaxial optical compensator 112a with the liquid crystal layer 100 interposed between them, is disposed such that the respective principal axes of the index ellipsoid thereof are defined as in the first uniaxial optical compensator 112a.

The second biaxial optical compensator 111b, which is disposed adjacent to the second uniaxial optical compensator 112b, is disposed such that the respective principal axes of the index ellipsoid thereof are defined as in the first biaxial optical compensator 111a.

Although not shown in FIG. 5, alignment films are provided on the light incoming plane 100A and light outgoing plane 100B of the liquid crystal layer 100. Specifically, the alignment film provided on the light incoming plane 100A of the liquid crystal layer 100 is subjected to a rubbing treatment in the direction that is defined by the azimuth angle ω of 315 degrees (i.e., as indicated by the solid arrow in FIG. 6). On the other hand, the alignment film provided on the light outgoing plane 100B of the liquid crystal layer 100 is subjected to a rubbing treatment in the direction that is defined by the azimuth angle ω of 45 degrees (i.e., as indicated by the dashed arrow in FIG. 6).

Figure 7:
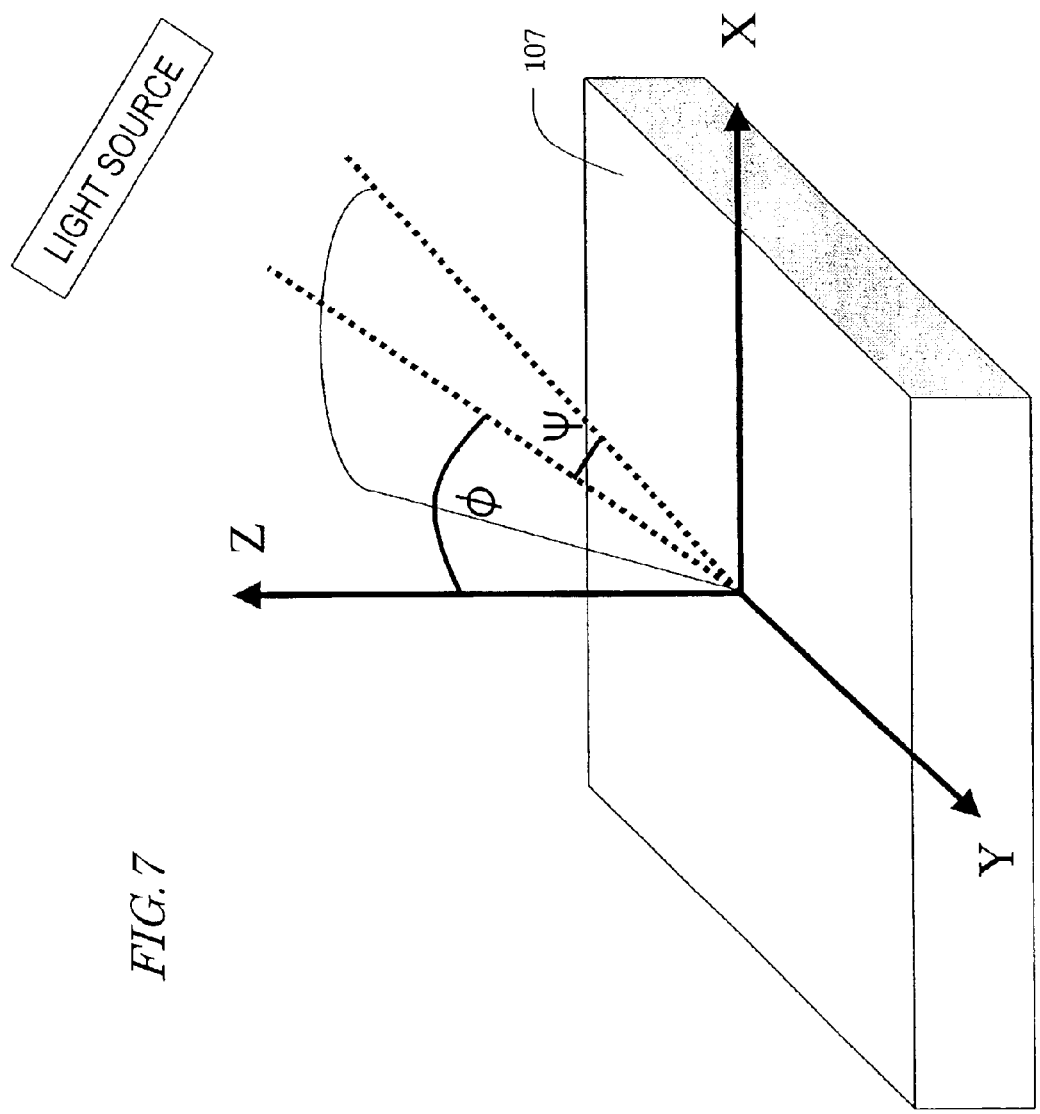
FIG. 7 is a schematic representation showing a direction in which incoming light is incident onto a liquid crystal panel.
Figure 8:
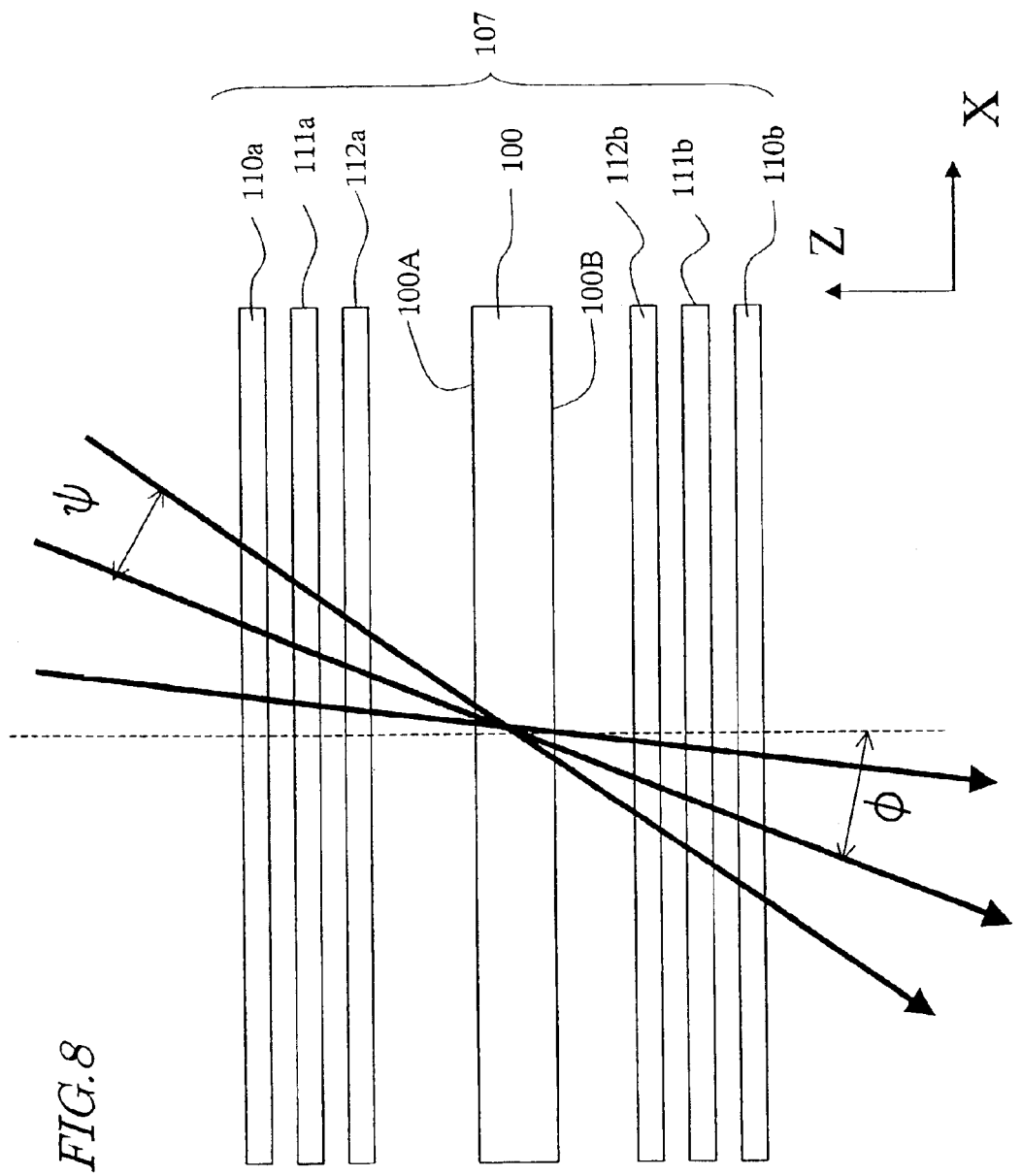
FIG. 8 is a cross-sectional view of the liquid crystal panel shown in FIG. 7 as viewed in the Y-axis direction.

In the projection type optical display system of this preferred embodiment, the incoming light entering the liquid crystal panel 107 has a conical light beam shape. This means that the incoming light enters the liquid crystal panel 107 with an expansion angle Ψ defined with respect to the optical axis of the principal light ray. In currently available projection type optical display systems, the expansion angle Ψ is about 12 degrees. In addition, due to the influences of the integrator optical system, reflector, or various lenses of the projection type optical display system, the optical axis of the light beam that is going to enter the liquid crystal panel 107 may define a tilt angle φ with respect to a normal to the major surface of the liquid crystal panel 107 (i.e., to the Z-axis direction). FIG. 7 is a schematic representation showing how an incoming light ray (i.e., an obliquely incident light ray) may define a tilt angle φ with respect to a normal to the major surface of the liquid crystal panel 107. FIG. 8 is a cross-sectional view of the liquid crystal panel 107 shown in FIG. 7 as viewed in the Y-axis direction. As shown in FIGS. 7 and 8, the angle ψ+φ of the incoming light sator had a retardation d1·Δnac of −500 nm and the biaxial optical compensators had total retardations d2$^r$·Δnab and d2$^r$·Δnac similar to those of Type No. 1.

The following Table 1 shows specific data about the liquid crystal panels 107 of the three projection type optical display systems according to the first preferred embodiment:

TABLE 1

Figure 9:
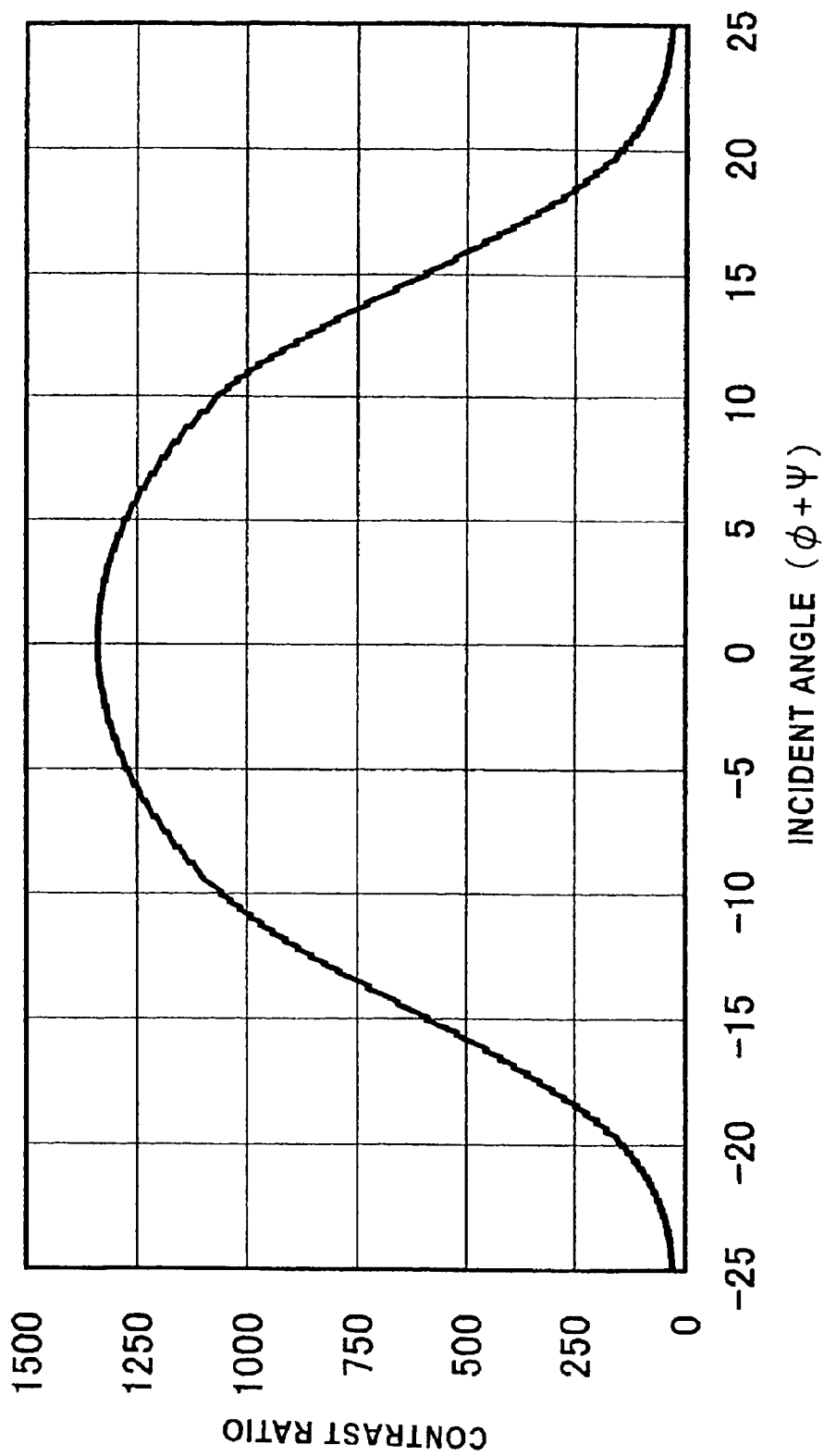
FIG. 9 is a graph showing the incident angle dependence of the contrast ratio in a conventional projection type optical display system.
Figure 10:
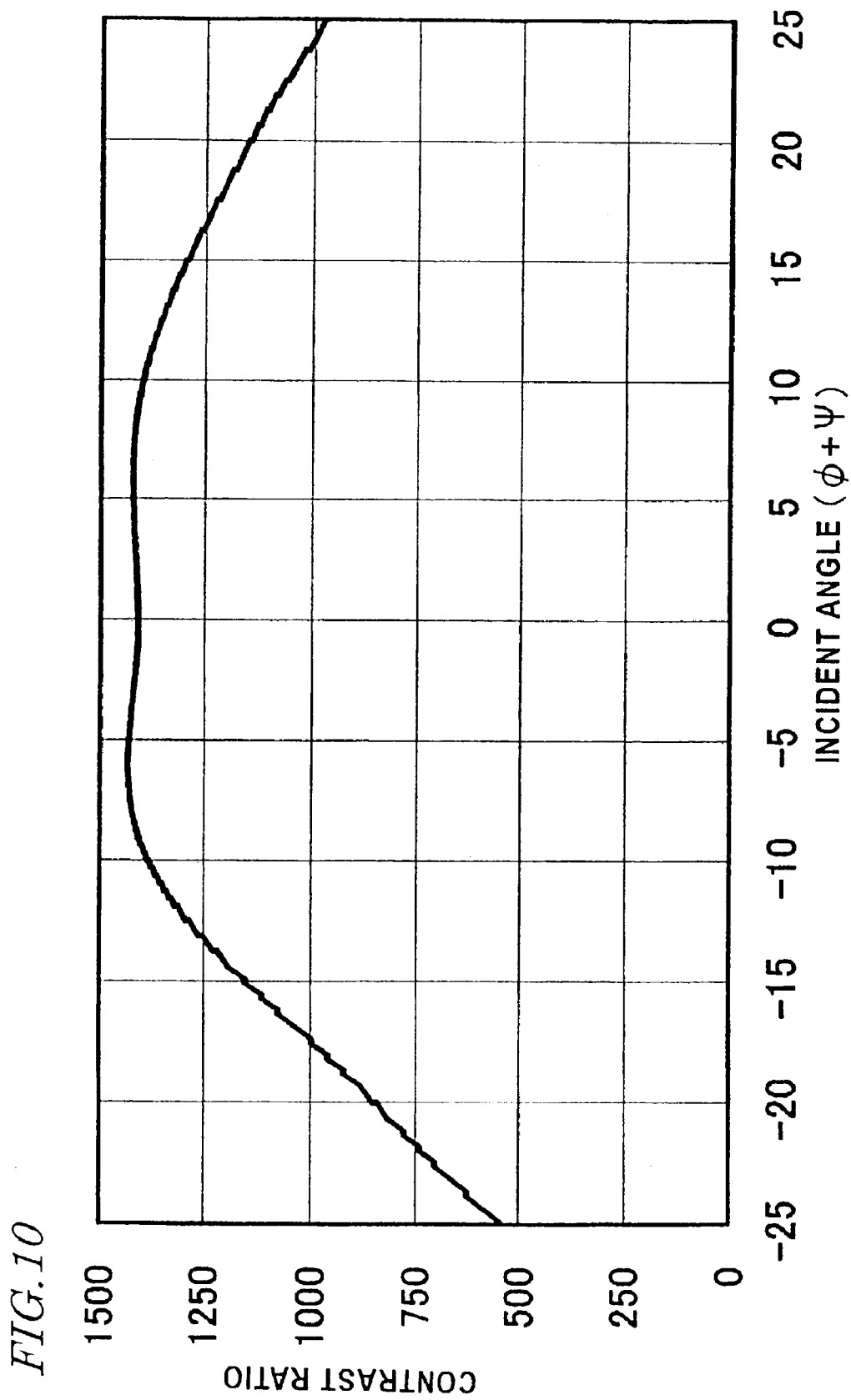
FIG. 10 is a graph showing the incident angle dependence of the contrast ratio in a projection type optical display system according to the first or second preferred embodiment of the present invention.
Figure 11:
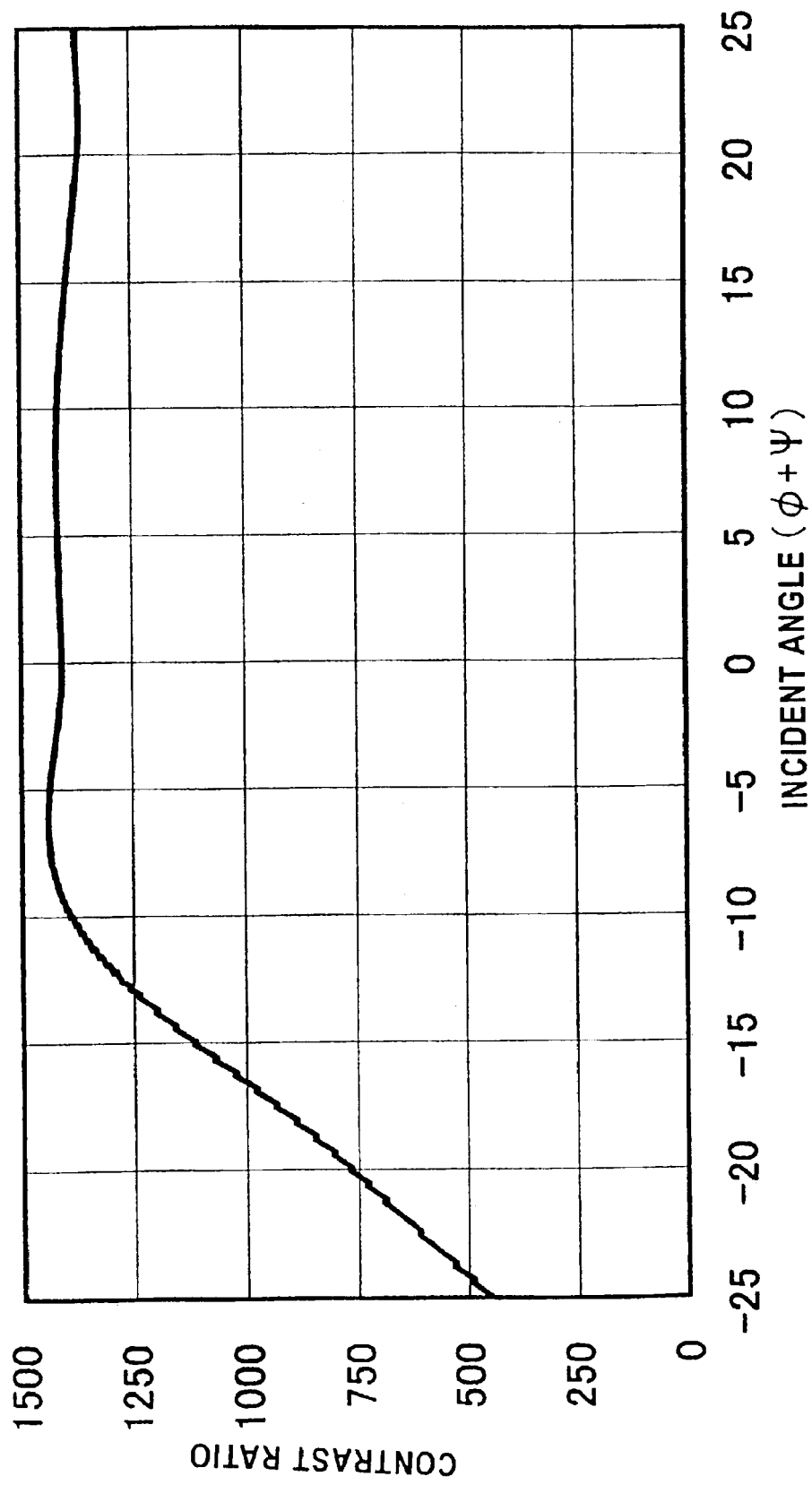
FIG. 11 is a graph showing the incident angle dependence of the contrast ratio in another projection type optical display system according to the first or second preferred embodiment of the present invention.
Figure 12:
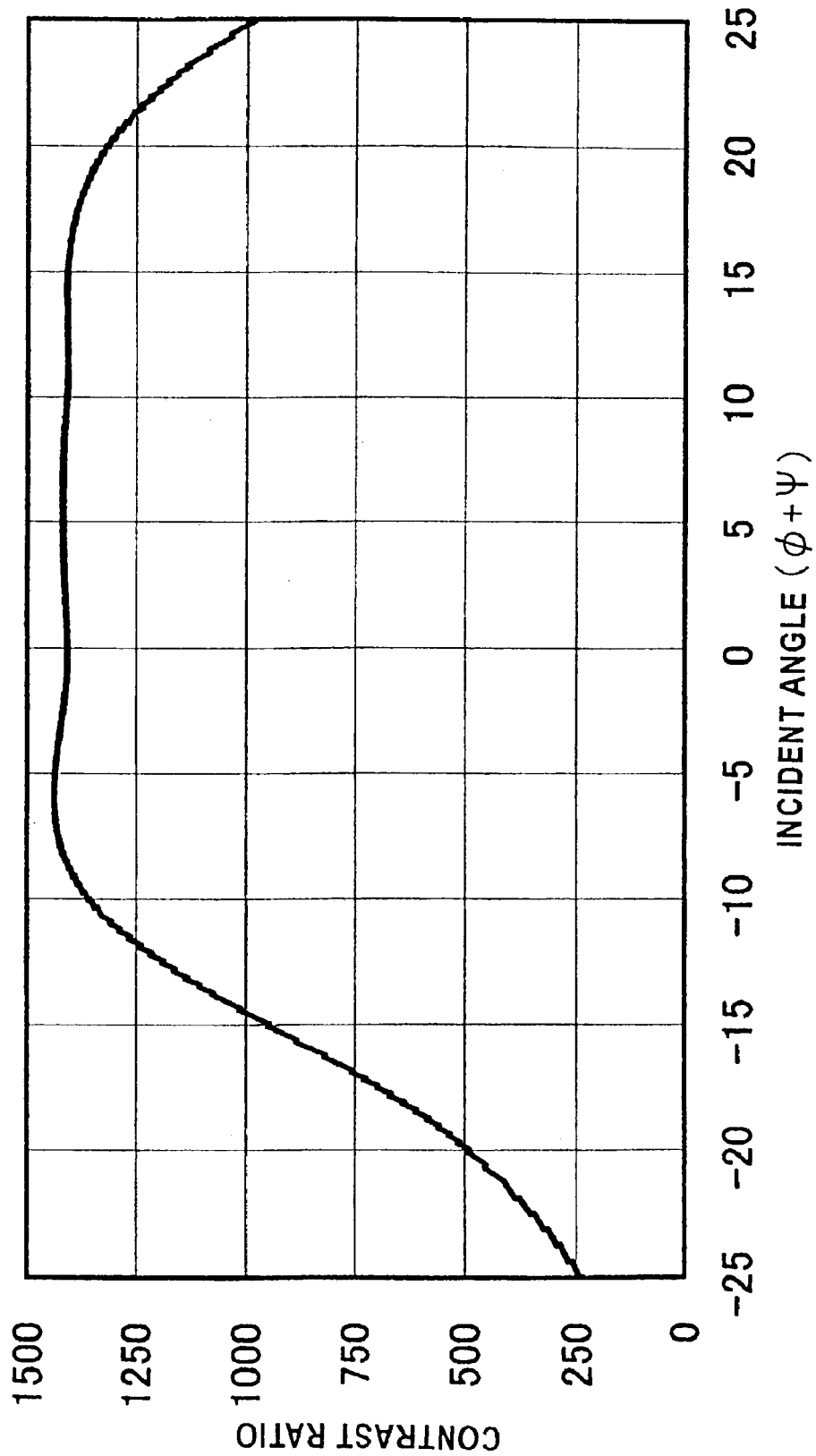
FIG. 12 is a graph showing the incident angle dependence of the contrast ratio in still another projection type optical display system according to the first or second preferred embodiment of the present invention.

|  | Prior art | Type No. 1 | Type No. 2 | Type No. 3 |
| --- | --- | --- | --- | --- |
| 1$^{st}$ biaxial optical compensator 111a | None | d · Δnab = 145 nm<br>d · Δnac = 60 nm | d · Δnab = 145 nm<br>d · Δnac = 60 nm | d · Δnab = 145 nm<br>d · Δnac = 60 nm |
| 1$^{st}$ uniaxial optical compensator 112a | None | d · Δnac = −250 nm<br>θ = 2.5° | d · Δnac = −300 nm<br>θ = 2.5° | d · Δnac = −500 nm<br>θ = 2.5° |
| 2$^{nd}$ uniaxial optical compensator 112b | None | d · Δnac = −250 nm<br>θ = 2.50° | d · Δnac = −150 nm<br>θ = 2.5° | None |
| 2$^{nd}$ biaxial optical compensator 111b | None | d · Δnab = 145 nm<br>d · Δnac = 60 nm | d · Δnab = 145 nm<br>d · Δnac = 60 nm | d · Δnab = 145 nm<br>d · Δnab = 60 nm |
| Contrast ratio | FIG. 9 | FIG. 10 | FIG. 11 | FIG. 12 | that substantially enters the liquid crystal panel 107 is approximately 25 degrees at most.

Three projection type optical display systems according to the first preferred embodiment (which will be referred to herein as Types Nos. 1, 2 and 3, respectively) were actually modeled with the retardations of the respective optical compensators defined in such a manner as to obtain a desired contrast ratio in view of the fact that the incoming light entering the liquid crystal panel 107 included the obliquely incident light ray shown in FIGS. 7 and 8. In Types Nos. 1 and 2, two pairs of uniaxial and biaxial optical compensators were provided between the liquid crystal layer 100 and the first polarizer 110a and between the liquid crystal layer 100 and the second polarizer 110b as shown in FIG. 5. In Type No. 3 on the other hand, the pair of uniaxial and biaxial optical compensators was provided between the liquid crystal layer 100 and the first polarizer 110a but only the biaxial optical compensator was provided between the liquid crystal layer 100 and the second polarizer 110b.

The total retardation d1$^r$·Δnac of the uniaxial optical compensators, where d1$^r$ is the total thickness of the uniaxial optical compensators, is given by Δnac=nc−na. It should be noted that if either of the two uniaxial optical compensators has a retardation that satisfies the inequality mentioned above, then the other uniaxial optical compensator may be omitted. On the other hand, the total retardations d2$^r$·Δnab and d2$^r$·Δnac of the biaxial optical compensators, where d2$^r$ is the total thickness of the biaxial optical compensators, are given by Δnab=nb−na and Δnac=nc−na.

In Type No. 1, the uniaxial optical compensators had a total retardation d1$^r$·Δnac of −500 nm and the biaxial optical compensators had a total retardation d2$^r$·Δnab of 290 nm and a total retardation d2$^r$·Δnac of 120 nm. In Type No. 2, the uniaxial optical compensators had a total retardation d1$^r$·Δnac of −450 nm and the biaxial optical compensators had total retardations d2$^r$·Δnab and d2$^r$·Δnac similar to those of Type No. 1. In Type No. 3, the uniaxial optical compen- FIGS. 10, 11 and 12 show the incident angle dependences of the contrast ratio as measured in the Types Nos. 1, 2 and 3, respectively. For the purpose of comparison, FIG. 9 shows the incident angle dependence of the contrast ratio as measured in a conventional projection type optical display system in which the liquid crystal panel included no optical compensators.

The incident angle dependences of the contrast ratio shown in FIGS. 9, 10, 11 and 12 were measured by the following method. Specifically, a light source was disposed on one side of the liquid crystal panel 107 and an optical intensity meter on the other side thereof. The liquid crystal panel 107 was provided such that a normal to the major surface of the liquid crystal panel 107 defined a tilt angle θ (=Ψ+φ) with respect to the optical axis of the principal light ray that had been emitted from the light source. The contrast ratios were calculated from the intensities that had been obtained with the angle θ changed. The contrast ratio was obtained by dividing the intensity of the outgoing light when no voltage was applied to the liquid crystal panel 107 (i.e., in the white display mode) by the intensity of the outgoing light when a voltage was applied to the liquid crystal panel 107 (i.e., in the black display mode).

Figure 13:
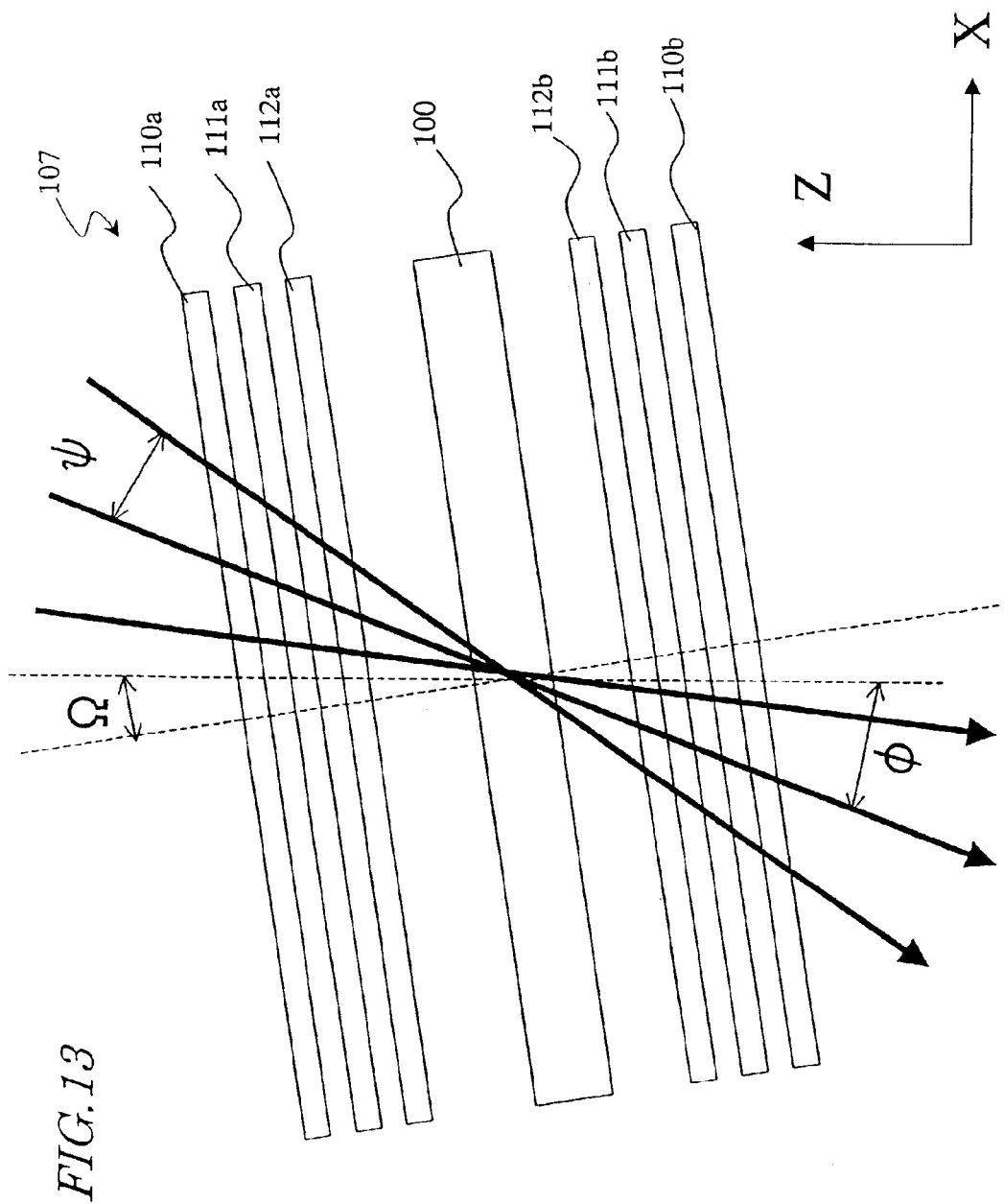
FIG. 13 shows an alternative arrangement for the liquid crystal panel 107.

Furthermore, another projection type optical display system, in which the liquid crystal panel 107 itself was tilted with respect to the principal light ray, was also prepared (which will be referred to herein as "Type No. 4"). In this Type No. 4, the liquid crystal panel 107 was provided such that a normal to the major surface of the liquid crystal panel 107 defined a tilt angle Ω with respect to the optical axis of the principal light ray to be incident onto approximately the center of the major surface of the liquid crystal panel 107 (i.e., with respect to the Z-axis direction) as shown in FIG. 13. The liquid crystal panel 107 of Type No. 4 had the same arrangement as the counterpart of Type No. 2. In Type No. 4, the tilt angle Ω was set equal to approximately 10 degrees. The following Table 4 shows specific data about the liquid crystal panel. 107 included in this Type No. 4 optical display system:

TABLE 2

Figure 14:
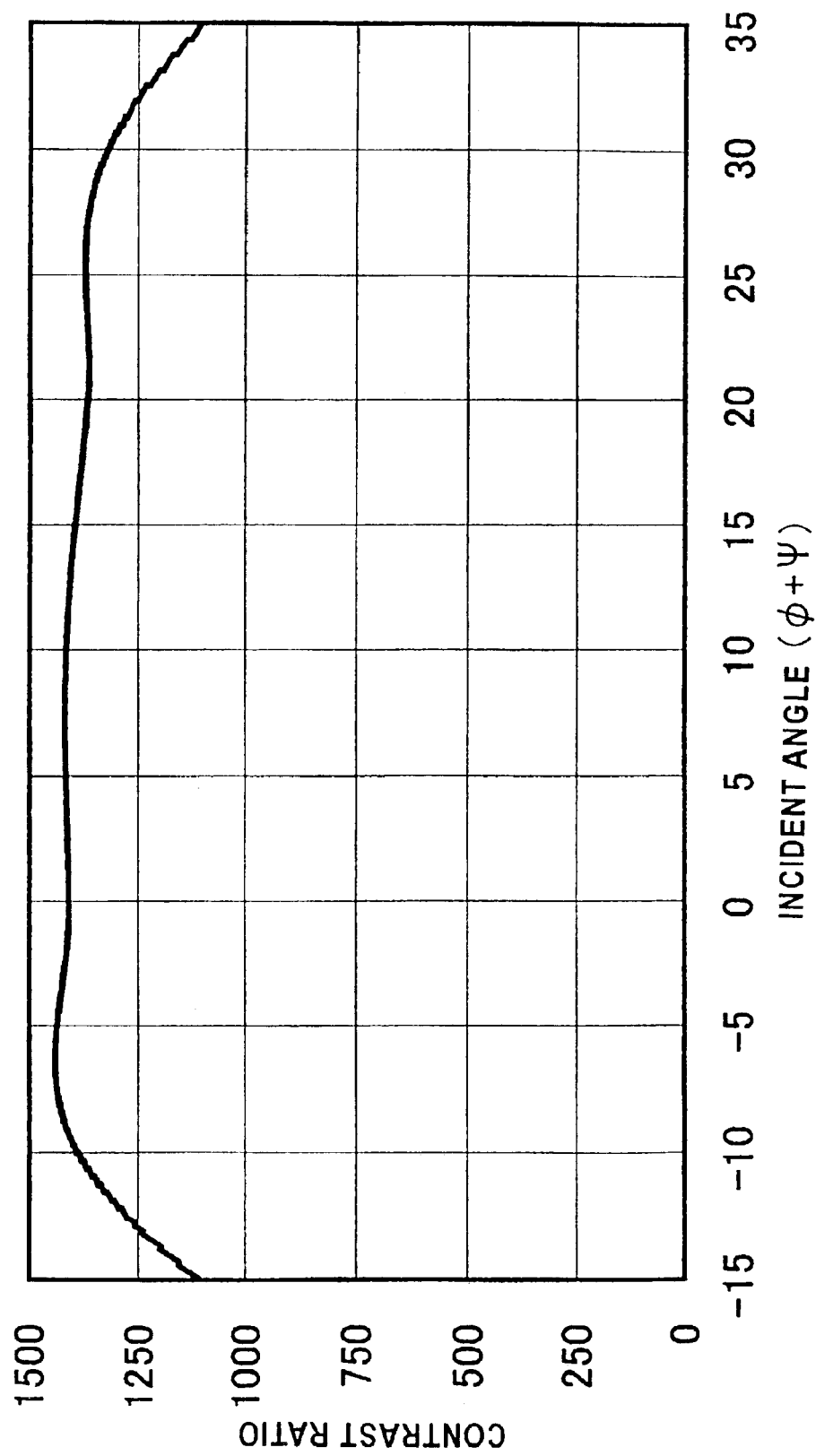
FIG. 14 is a graph showing the incident angle dependence of the contrast ratio in yet another projection type optical display system according to the first or second preferred embodiment of the present invention.

| | Type No. 4 |
|---|---|
| 1st biaxial optical compensator 111a | d · Δnab = 145 nm<br>d · Δnac = 60 nm |
| 1st uniaxial optical compensator 112a | d · Δnac = −300 nm<br>θ = 2.5° |
| 2nd uniaxial optical compensator 112b | d · Δnac = −150 nm<br>θ = 2.5° |
| 2nd biaxial optical compensator 111b | d · Δnab = 145 nm<br>d · Δnac = 60 nm |
| Contrast ratio | FIG. 14 |

FIG. 14 shows the incident angle dependence of the contrast ratio as measured in the Type No. 4 optical display system. In the projection type optical display system of Type No. 4, even when the incident angle was about 25 degrees, the resultant contrast ratio was almost as high as the situation where the incident angle was around 0 degrees.

In the liquid crystal panels of the Types Nos. 1 through 4 optical display systems, the liquid crystal layers thereof had retardations that fell within the range of 350 nm ≦ d·Δn ≦ 500 nm (where d is the thickness of the liquid crystal layer and Δn is the anisotropic refractive index of the liquid crystal material).

Consequently, in the projection type optical display system of this first preferred embodiment, a high contrast ratio could be obtained in a broad viewing angle range.

Embodiment 2

Figure 15:
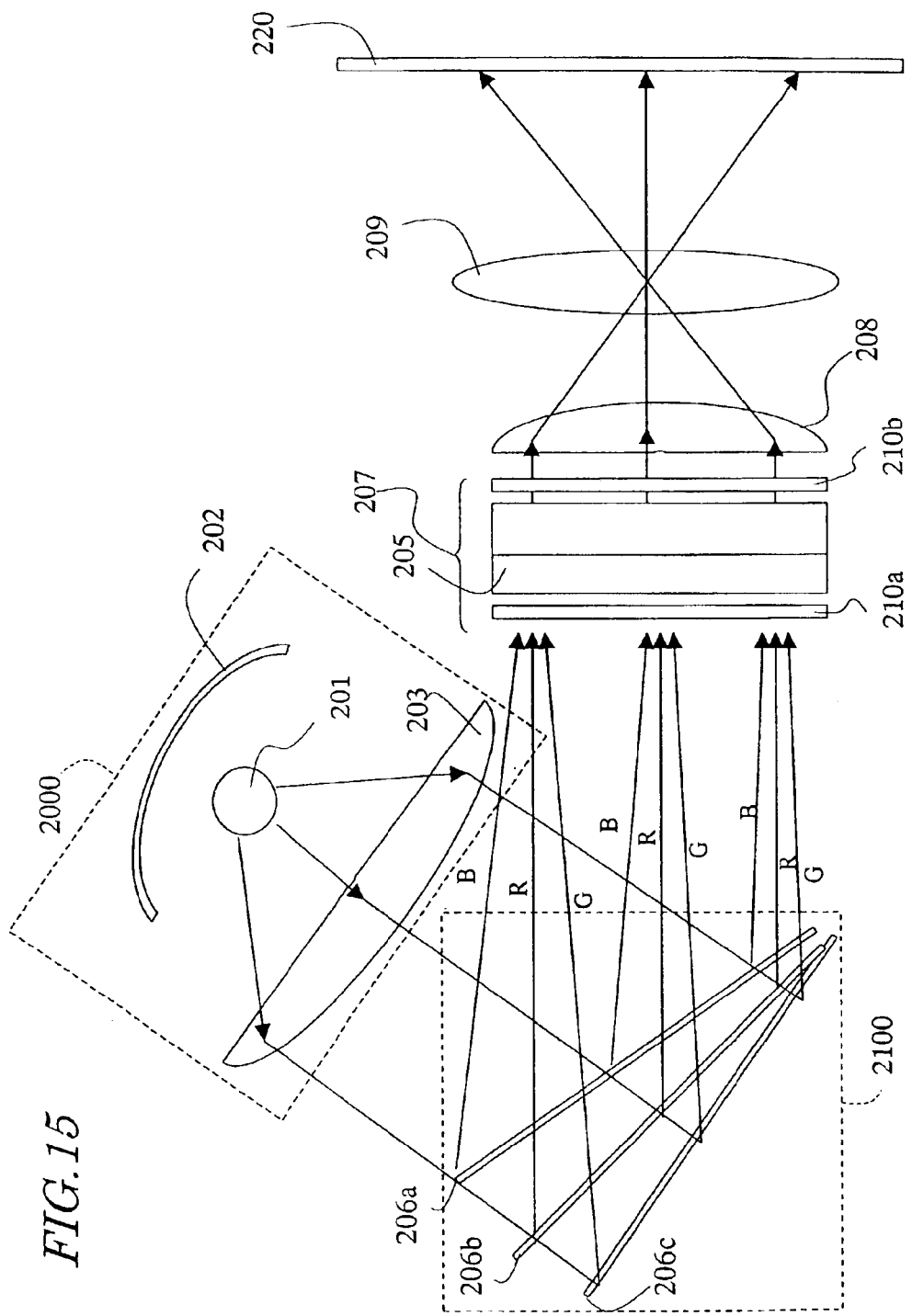
FIG. 15 is a schematic representation of a single-panel projection type optical display system according to a second specific preferred embodiment of the present invention.

FIG. 15 is a schematic representation of a single-panel projection type optical display system according to a second specific preferred embodiment of the present invention.

As shown in FIG. 15, the projection type optical display system of the second preferred embodiment includes an illumination optical system 2000, a color separation optical system 2100, a liquid crystal panel a field lens 208 and a projection lens 209.

The illumination optical system 2000 includes a light source 201, a reflector 202 and a lens 203.

The color separation optical system 2100 includes three dichroic mirrors 206a, 206b and 206c, which are not arranged parallel to each other but substantially in a fan shape. By arranging the dichroic mirrors 206a, 206b and 206c in such a shape, the outgoing light rays of the illumination optical system 2000 are incident onto the dichroic mirrors 206a, 206b and 206c at mutually different angles.

Figure 17:
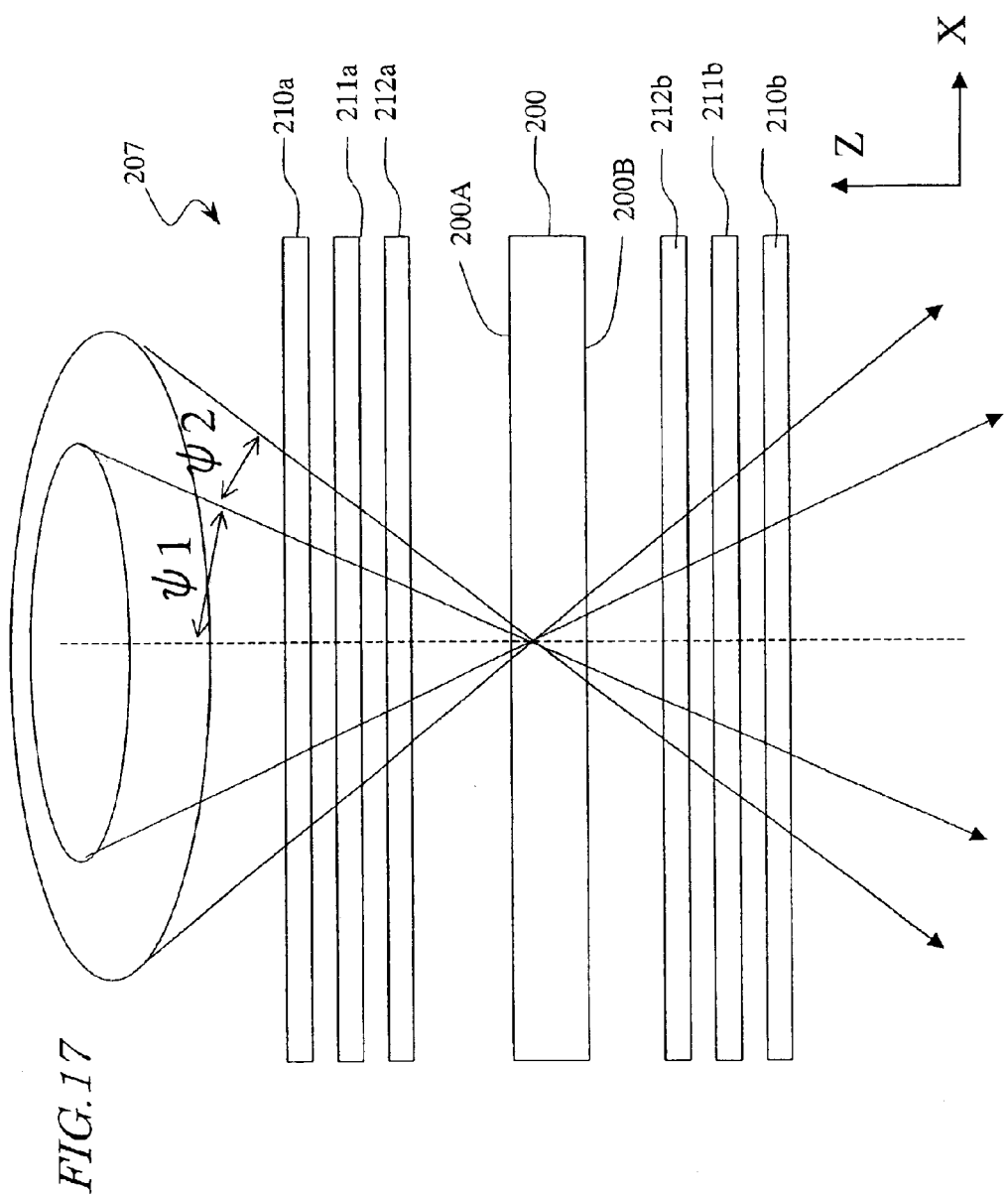
FIG. 17 is a cross-sectional view of the liquid crystal panel of the projection type optical display system shown in FIG. 15.

The liquid crystal panel 207 has the same arrangement as the liquid crystal panel 107 shown in FIG. 5 except that microlenses 205 are provided between a first uniaxial optical compensator 212a and a liquid crystal layer 200. Specifically, as shown in FIG. 17, the liquid crystal panel 207 includes the liquid crystal layer 200, a first polarizer 210a, a second polarizer 210b, the microlenses 205 (not shown in FIG. 17), the first uniaxial optical compensator 212a, a first biaxial optical compensator 211a, a second uniaxial optical compensator 212b and a second biaxial optical compensator 211b. The first polarizer 210a is provided so as to face the light incoming plane 200A of the liquid crystal layer 200, while the second polarizer 210b is provided so as to face the light outgoing plane 200B of the liquid crystal layer 200. The first uniaxial optical compensator 212a is provided between the liquid crystal layer 200 and the first polarizer 210a. The first biaxial optical compensator 211a is provided between the first uniaxial optical compensator 212a and the first polarizer 210a. The second uniaxial optical compensator 212b is provided between the liquid crystal layer 200 and the second polarizer 210b. The second biaxial optical compensator 211b is provided between the second uniaxial optical compensator 212b and the second polarizer 210b.

In this projection type optical display system, first, the white light that has been emitted from the light source 201 of the illumination optical system 2000 is incident onto the dichroic mirrors 206a, 206b and 206c of the color separation optical system 2100. This incoming white light is separated into R, G and B light rays by getting the red, green and blue components of the light selectively reflected by the dichroic mirrors 206b, 206c and 206a, respectively. Then, the R, G and B light rays separated are incident onto the same liquid crystal panel 207 at mutually different angles. In the liquid crystal panel 207, the R, G and B light rays are redistributed by the microlenses 205, regularly converged onto respective pixels and modulated on a color-by-color basis. Thereafter, the modulated R, G and B light rays are transmitted through the field lens 208, synthesized together by the projection lens 209 and then projected as a color image onto a screen 220.

Figure 16:
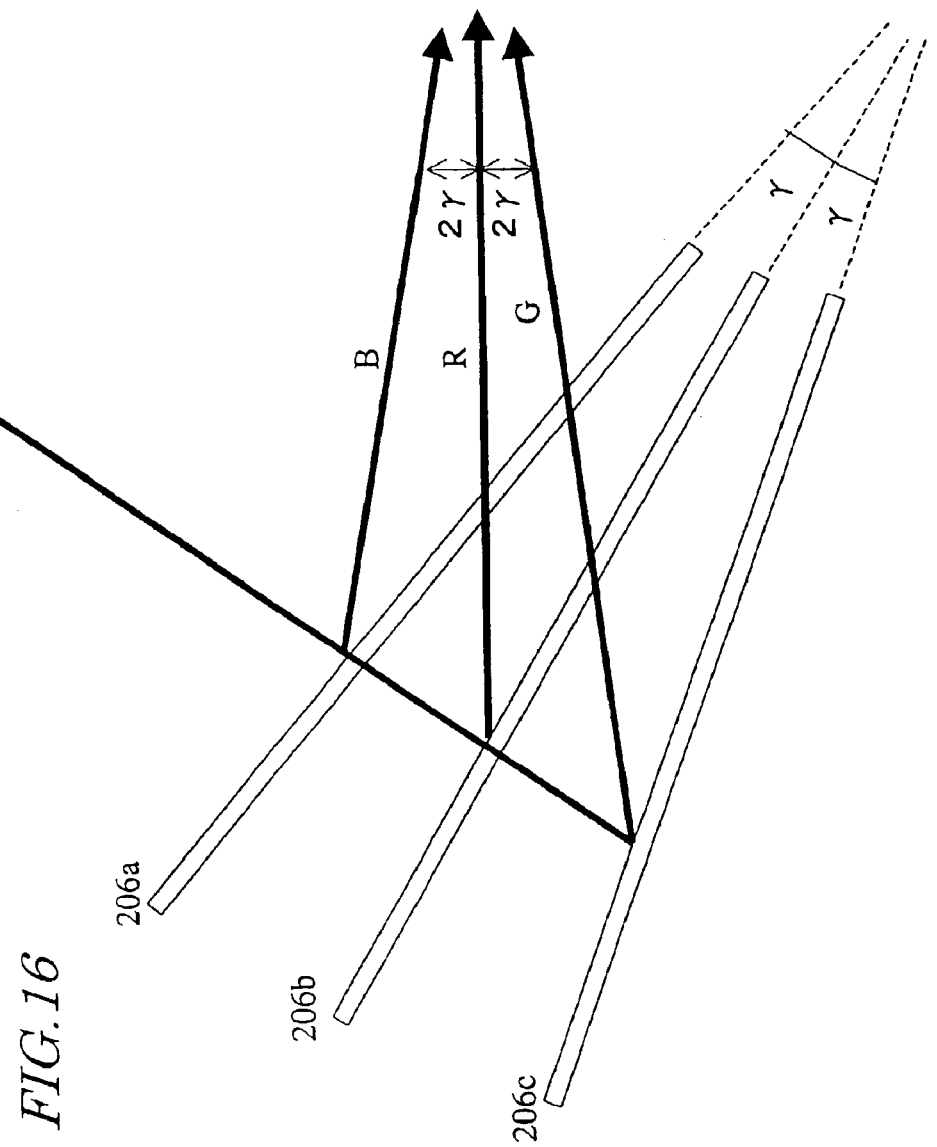
FIG. 16 shows an exemplary arrangement of the dichroic mirrors in the projection type optical display system shown in FIG. 15.

As already described for the first preferred embodiment with reference to FIGS. 7 and 8, each of the R, G and B light rays that are going to enter the liquid crystal panel 207 has an expansion angle Ψ that is defined with respect to the optical axis thereof. Furthermore, in this second preferred embodiment, the three dichroic mirrors 206a, 206b and 206c are arranged substantially in a fan shape. Thus, each of the R, G and B light rays that have been reflected by the dichroic mirrors 206a, 206b and 206c defines another expansion angle. Specifically, as shown in FIG. 16, the dichroic mirrors 206a, 206b and 206c are arranged such that the dichroic mirror 206a is closest to the light source 201 and the dichroic mirror 206c is farthest from the light source 201. Also, an angle γ is defined between the dichroic mirrors 206a and 206b and the same angle γ is also defined between the dichroic mirrors 206b and 206c as also shown in FIG. 16. Thus, the light, including the R, G. and B light rays that have been reflected by the dichroic mirrors 206b, 206c and 206a, respectively, is incident onto the liquid crystal panel 207 so as to define an expansion angle 2γ with respect to the optical axis thereof. Accordingly, in this second preferred embodiment, the R, G and B light rays are incident onto the liquid crystal panel 207 at an expansion angle 2γ+ψ. That is to say, compared to the three-panel projection type optical display system of the first preferred embodiment described above, the angle of incidence of the light on the liquid crystal panel 207 increases by 2γ. Considering that the contrast ratio decreases with the increase in the tilt angle defined by the optical axis of the light ray entering the liquid crystal panel 207 with respect to a normal to the major surface of the liquid crystal panel 207 the angle γ is herein set equal to about 4 degrees, for example.

In the conventional single-panel projection type optical display system, the incident angle increases by about 8 degrees compared to the three-panel projection type optical display system of the first preferred embodiment, for example, and therefore, the contrast ratio decreases more easily. Also, in the conventional single-panel projection type optical display system, a portion of the incoming light that is going to enter the liquid crystal panel as defined by the angle Ψ2 in FIG. 17 cannot contribute to the display of an image on the projection type optical display system for the reasons to be described later. Thus, it is difficult for the conventional single-panel projection type optical display system to display a bright image thereon.

FIG. 17 schematically shows the directions in which the light rays are transmitted through the liquid crystal panel 207. In the incoming light that is going to enter the liquid crystal panel 207 as defined by the angle Ψ (=Ψ1+Ψ2), its component with a relatively low degree of parallelism as defined by the angle Ψ2 is normally cut off with a diaphragm provided for a fly eye lens, for example, so as not to be incident onto the liquid crystal panel 207 or used for display purposes in the projection type optical display system. Meanwhile, the projection type optical display system of this preferred embodiment can also utilize such a component that has normally been cut off, thus realizing the display of a brighter image.

In the single-panel projection type optical display system shown in FIG. 15, if the R, G and B light rays, which have been separated by the dichroic mirrors and which are about to enter the liquid crystal panel 207 partially overlap with each other, then those light rays may be mixed together to produce light with low color purity, thus resulting in deteriorated display quality. Accordingly, to avoid such mixture of the R, G and B light rays, the three dichroic mirrors to be arranged in a fan shape should have its angle γ maximized. However, if the angle γ is increased excessively, then the optical axis of the incoming light that is going to enter the liquid crystal panel may define too large a tilt angle with respect to a normal to the panel plane. In that case, the contrast ratio may drop so significantly that a grey scale inversion phenomenon sometimes happens.

In view of these considerations, in the prior art, the angle γ defined between the dichroic mirrors and the angle of incidence of the light on the liquid crystal panel are both limited, and the component of the light as defined by the angle Ψ is not used for display purposes in the projection type optical display system. Also, to achieve a desired contrast ratio, a lens with a relatively large F value needs to be used, thus realizing low optical efficiency.

In contrast, in this preferred embodiment, the design and arrangement of the optical compensators are optimized. Accordingly, even if the angle γ defined between the dichroic mirrors is set greater than the conventional one, the decrease in contrast ratio can be minimized. In addition, a lens having an F value of less than 1.8 may be used. Thus, the component of the light as defined by the angle Ψ can also be used. As a result, the optical efficiency can be increased and the display of a brighter image is realized.

In this second preferred embodiment, four projection type optical display systems (which will be referred to herein as "Types Nos. 5, 6, 7 and 8") were also prepared with the retardations of the optical compensators changed as in the first preferred embodiment described above. The following Tables 3 and 4 show the specific data about the liquid crystal panels of the Types Nos. 5 through 8 optical display systems. The liquid crystal panels of the Types Nos. 5 through 8 optical display systems included the same optical compensators as the liquid crystal panels of the Types Nos. 1 through 4 optical display systems, respectively.

The following Tables 3 and 4 also show the brightness values of the respective projection type optical display systems that were calculated as relative values when the brightness of the conventional projection type optical display system, including no optical compensators for the liquid crystal panel, was supposed to be one. As in Tables 1 and 2, these Tables 3 and 4 also show the viewing angle (or incident angle) dependences of the contrast ratio. It should be noted that the viewing angle dependences of the contrast ratio as measured in the Types Nos. 5 through 8 optical display systems were similar to the results obtained for the Types Nos. 1 through 4 optical display systems of the first preferred embodiment described above.

TABLE 3

|  | Prior art | Type No. 5 | Type No. 6 | Type No. 7 |
| --- | --- | --- | --- | --- |
| 1st biaxial optical compensator 211a | None | d · Δnab = 145 nm<br>d · Δnac = 60 nm | d · Δnab = 145 nm<br>d · Δnac = 60 nm | d · Δnab = 145 nm<br>d · Δnac = 60 nm |
| 1st uniaxial optical compensator 212a | None | d · Δnac = −250 nm<br>θ = 2.5° | d · Δnac = −300 nm<br>θ = 2.5° | d · Δnac = −500 nm<br>θ = 2.5° |
| 2nd uniaxial optical compensator 212b | None | d · Δnac = −250 nm<br>θ = 2.5° | d · Δnac = −150 nm<br>θ = 2.5° | None |
| 2nd biaxial optical compensator 211b | None | d · Δnab = 145 nm<br>d · Δnac = 60 nm | d · Δnab = 145 nm<br>d · Δnac = 60 nm | d · Δnab = 145 nm<br>d · Δnab = 60 nm |
| Relative brightness | 1 | 1.5 | 1.3 | 1.6 |
| Contrast ratio | FIG. 9 | FIG. 10 | FIG. 11 | FIG. 12 |

TABLE 4

|  | Type No. 8 |
| --- | --- |
| 1st biaxial optical compensator 211a | d · Δnab = 145 nm<br>d · Δnac = 60 nm |
| 1st uniaxial optical compensator 212a | d · Δnac = −300 nm<br>θ = 2.5° |
| 2nd uniaxial optical compensator 212b | d · Δnac = −150 nm<br>θ = 2.5° |
| 2 biaxial optical compensator 211b | d · Δnab = 145 nm<br>d · Δnac = 60 nm |
| Relative brightness | 1.8 |
| Contrast ratio | FIG. 14 |

Consequently, in the projection type optical display system of this second preferred embodiment, a high contrast ratio could be obtained in a broad viewing angle range, and a brighter image could be displayed thanks to the increase in optical efficiency.

Embodiment 3

Figure 21:
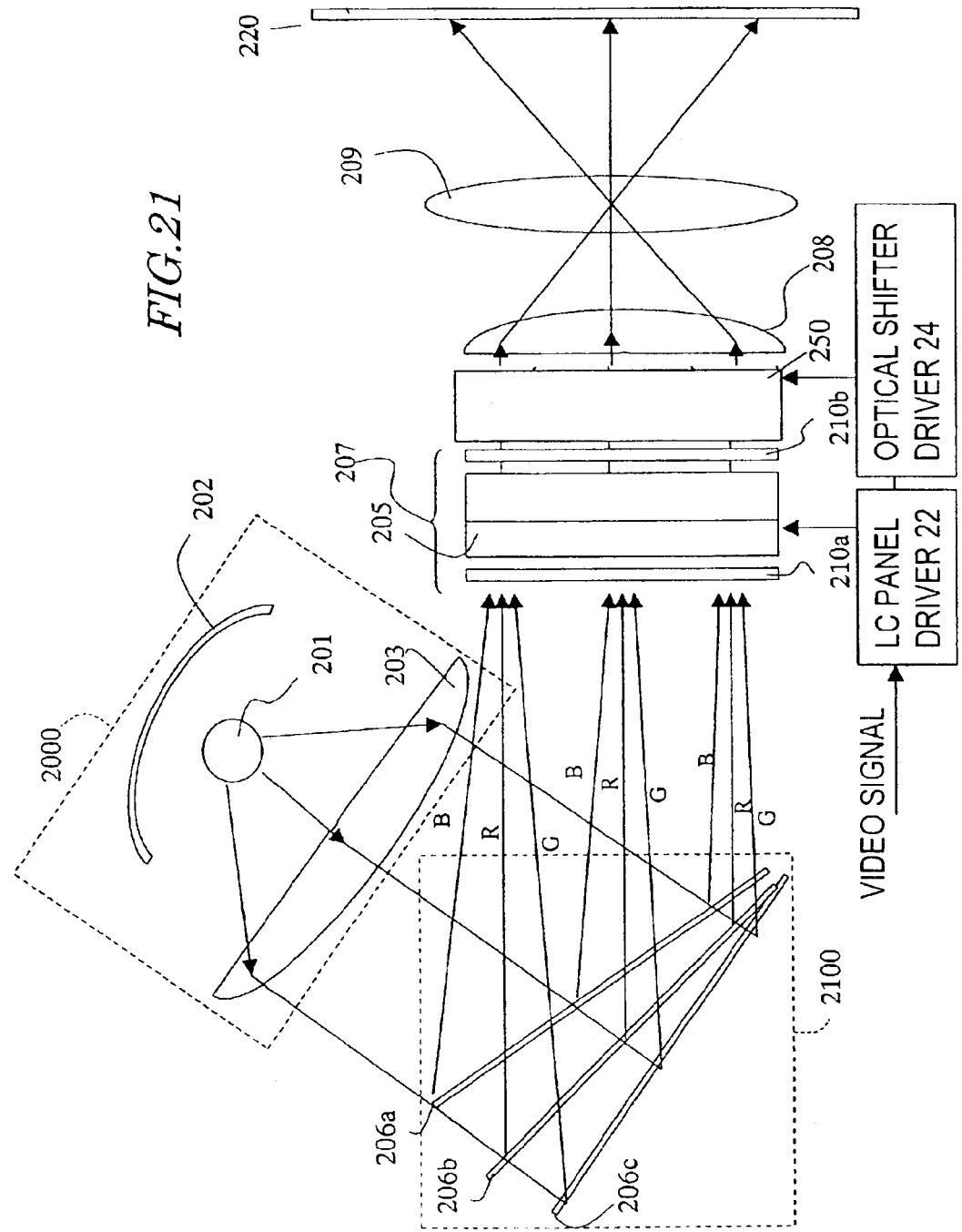
FIG. 21 is a schematic representation of a single-panel projection type optical display system according to a third specific preferred embodiment of the present invention.

FIG. 21 is a schematic representation of a single-panel panel projection type optical display system according to a third specific preferred embodiment of the present invention.

The projection type optical display system of this third preferred embodiment includes not only all members of the projection type optical display system of the second preferred embodiment described above but also an optical shifter 250. The projection type optical display system of the third preferred embodiment realizes a high-resolution full-color display in addition to the effects achieved by the projection type optical display system of the second preferred embodiment described above. In the projection type optical display system of the third preferred embodiment, each member having the same function as the counterpart of the projection type optical display system of the second preferred embodiment is identified by the same reference numeral and the description thereof will be omitted herein.

In the projection type optical display system of this third preferred embodiment, the optical shifter 250 is provided between the liquid crystal panel 207 and the field lens 208 as shown in FIG. 21. Also, a liquid crystal panel driver 22 and an optical shifter driver 24 are connected to the liquid crystal panel 207 and optical shifter 250, respectively.

Although not shown in FIG. 15, the liquid crystal panel driver 22 is also connected to the liquid crystal panel 207 of the projection type optical display system of the second preferred embodiment described above. The liquid crystal panel driver 22 supplies a drive signal and a video signal to the liquid crystal panel 207. In response, the liquid crystal panel 207 can display an image of which the contents are represented by the video signal. In the projection type optical display system of this third preferred embodiment, the liquid crystal panel driver 22 generates data representing multiple image subframes from data representing each frame of the image to be formed by the projection lens 209 onto the screen 220 and the liquid crystal panel 207 presents those image subframes thereon time-sequentially.

The operation of the optical shifter 250 is controlled by the optical shifter driver 24. Synchronously with the display of a video on the liquid crystal panel 207 the optical shifter driver 24 supplies a drive signal to the optical shifter 250. The driver 24 includes a voltage applying section for applying high and/or low voltages separately to multiple liquid crystal cells included in the optical shifter 250.

Hereinafter, the arrangement and operation of the optical shifter 250 will be described in detail.

Figure 22:
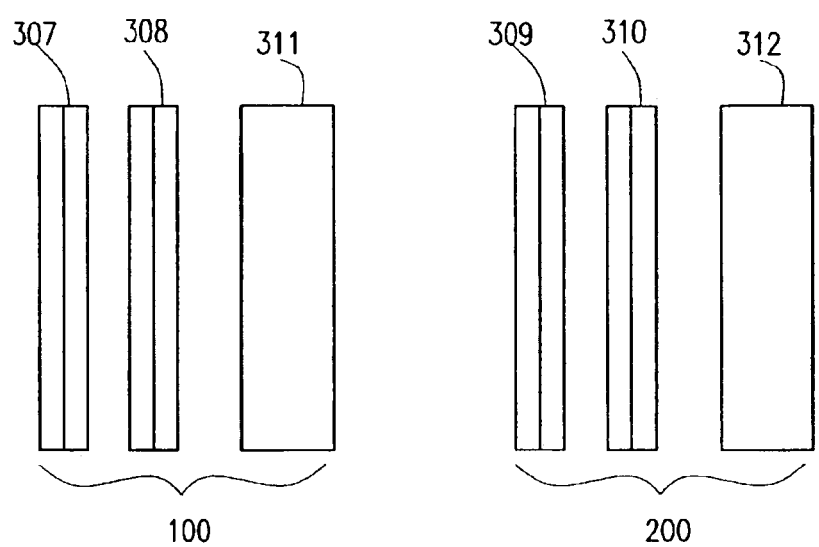
FIG. 22 is a schematic representation of an optical shifter for use in the single-panel projection type optical display system of the third preferred embodiment.

As shown in FIG. 22, the optical shifter 250 includes a first shifting section 100 for shifting the image vertically and a second shifting section 200 for shifting the image horizontally.

The first shifting section 100 includes two liquid crystal cells 307 and 308 and one birefringent element 311 Likewise, the second shifting section 200 also includes two liquid crystal cells 309 and 310 and one birefringent element 312. Each of the liquid crystal cells 307, 308, 309 and 310 includes: a liquid crystal layer; a pair of transparent electrodes (not shown) provided on the light incoming and outgoing sides of the liquid crystal layer, respectively; and a pair of transparent substrates that sandwiches these members between them. Although the liquid crystal cells 307 and 308 and the birefringent element 311 shown in FIG. 22 are horizontally spaced apart from each other, the liquid crystal cells 307 and 308 and the birefringent element 311 may be bonded together with an adhesive, for example, so that the first shifting section 100 works as one integral component. The same statement is applicable to the second shifting section 200.

In this preferred embodiment, the liquid crystal cells 307, 308, 309 and 310 may be TN mode liquid crystal cells. Thus, the liquid crystal layer of these liquid crystal cells 307, 308, 309 and 310 switches from a first state of rotating the plane of polarization of the incoming light by 90 degrees into a second state of transmitting the incoming light as it is substantially without rotating the plane of polarization, or vice versa, depending on whether the voltage applied thereto is high or low.

However, the liquid crystal cells 307, 308, 309 and 310 are not limited to the TN mode liquid crystal cells. Alternatively, any other type of liquid crystal cells may also be used as long as the unwanted polarized components produced by one of the two liquid crystal cells are canceled by the other liquid crystal cell while the two liquid crystal layers thereof are both switching from ON state into OFF state. For example, ECB mode liquid crystal cells may be naturally used.

Each of the birefringent elements 311 and 312 has an optic axis that defines a predetermined tilt angle with respect to the light incoming plane of the birefringent element 311 or 312. On a plane including the propagation direction of the incoming light and the optic axis (which will be referred to herein as a "principal plane"), the birefringent elements 311 and 312 can separate the incoming light into an ordinary ray and an extraordinary ray. Accordingly, if the polarization direction of the incoming light that is going to enter the birefringent element 311 or 312 is perpendicular to the principal plane, then the incoming light is an ordinary ray for the birefringent element 311 or 312 and is propagated straight through the principal plane. On the other hand, if the polarization direction of the incoming light that is going to enter the birefringent element 311 or 312 is parallel to the principal plane, then the incoming light is an extraordinary ray for the birefringent element 311 or 312 and is refracted within the principal plane.

The birefringent elements 311 and 312 may be made of a uniaxial crystalline material (e.g., quartz). However, the material for the birefringent elements 311 and 312 is not limited to quartz but may be any other uniaxial crystalline material. Examples of other preferred materials include lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy $\Delta n$ is preferably used. When the birefringent elements 311 and 312 are made of such a high $\Delta n$ material, the minimum required image shift is achieved by the birefringent elements 311 and 312 with a reduced thickness. Thus, such a material can be used effectively to reduce the overall size or weight of the display system.

If the voltages applied to the liquid crystal cells 307 and 308 or 309 and 310 are changed, the polarization direction of the incoming light can be switched from perpendicular into parallel, or vice versa, to the principal plane of the birefringent element 311 or 312. In this manner, the incoming light can be shifted within the principal plane of the birefringent element 311 or 312. As a result, the image that is displayed on the liquid crystal panel 207 can be shifted perpendicularly to the optical axis of the incoming light.

The second shifting section 200 also has the same configuration as the first shifting section 100. The only difference between these two shifting sections 100 and 200 is that the second shifting section 200 is disposed so as to define an angle of rotation of 90 degrees on the optical axis of the incoming light with respect to the first shifting section 100. Accordingly, the pixel shifting direction of the second shifting section 200 is perpendicular to that of the first shifting section 100. By using the first and second shifting sections 100 and 200 that are disposed at such positions, the image can be selectively shifted to one of four mutually different locations on the same (virtual) plane.

Hereinafter, it will be described with reference to FIGS. 23A through 23D and the following Table 5 how the optical shifter according to this preferred embodiment operates.

TABLE 5

| Shift | Applied voltage: high or low | | | |
|---|---|---|---|---|
| Location | LC cell 307 | LC cell 308 | LC cell 309 | LC cell 310 |
| A | OFF | OFF | OFF | ON |
| B | OFF | ON | ON→OFF | ON→OFF |
| C | OFF | ON | OFF | ON |
| D | ON→OFF | ON→OFF | ON→OFF | ON→OFF |

Figure 23A:
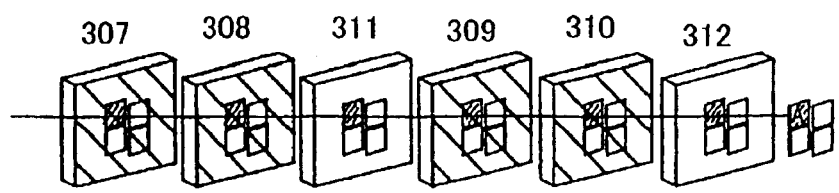
FIGS. 23A, 23B, 23C and 23D show how the optical shifter shown in FIG. 22 may operate.

First, as shown in FIG. 23A, the liquid crystal cells 307, 308 and 309 are turned OFF but the liquid crystal cell 310 is turned ON. In this case, an arbitrary pixel of the image that is presented on the liquid crystal panel is supposed to be present at location A on the virtual plane.

Figure 23B:
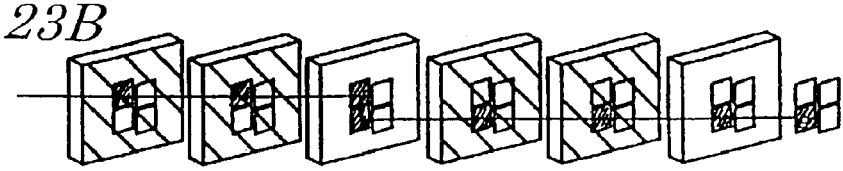

Next, as shown in FIG. 23B, the liquid crystal cells 308 and 309 are turned ON and the liquid crystal cell 310 is kept ON to shift the pixel to location B. The image is shifted by turning the OFF-state liquid crystal cells 308 and 309 ON. Accordingly, this shifting can be carried out relatively quickly synchronously with the switching of the image subfields.

Thereafter, while the current subfield is still being displayed, the ON-state liquid crystal cells 309 and 310 are turned OFF. The response of the liquid crystal material to the turn OFF of these liquid crystal cells 309 and 310 is slow. However, since the liquid crystal cells 309 and 310 are made of dextrorotatory and levorotatory liquid crystal materials, respectively, the polarization direction of the polarized light that is going to enter the birefringent element 312 is the same as the original one of the polarized light that was incident on the liquid crystal cell 309. Accordingly, the pixel location remains B.

Figure 23C:
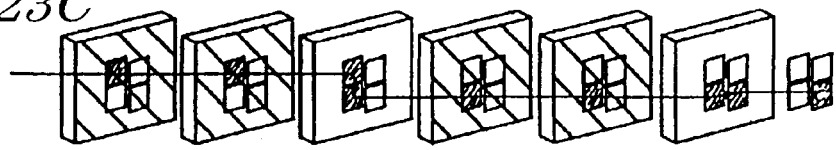

Subsequently, as shown in FIG. 23C, the liquid crystal cell 308 is kept ON and the liquid crystal cell 310 is turned ON to shift the pixel to location C. The image is shifted by turning the OFF-state liquid crystal cell 310 ON. Accordingly, this shifting can also be carried out relatively quickly synchronously with the switching of the image subfields.

Figure 23D:
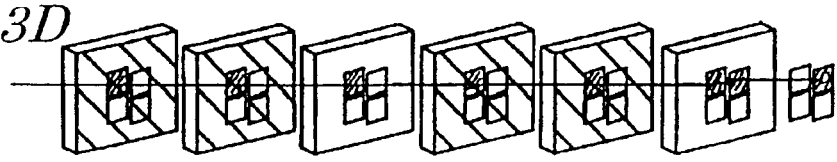

Next, as shown in FIG. 23D, the liquid crystal cells 307 and 309 are turned ON and the two other liquid crystal cells 308 and 310 are kept ON to shift the pixel to location D. Thereafter, while the current subfield is still being displayed, the ON-state liquid crystal cells 307, 308, 309 and 310 are all turned OFF. Even so, the polarization direction of the polarized light that is going to enter the birefringent element 312 is the same as the original one of the polarized light that was incident on the liquid crystal cell 309. Accordingly, the pixel location remains D.

Thereafter, the image is shifted from the location D to the location A by turning the OFF-state liquid crystal cell 310 ON and can be carried out as quickly as the shifting of the image to the location B, C or D.

Figure 24:
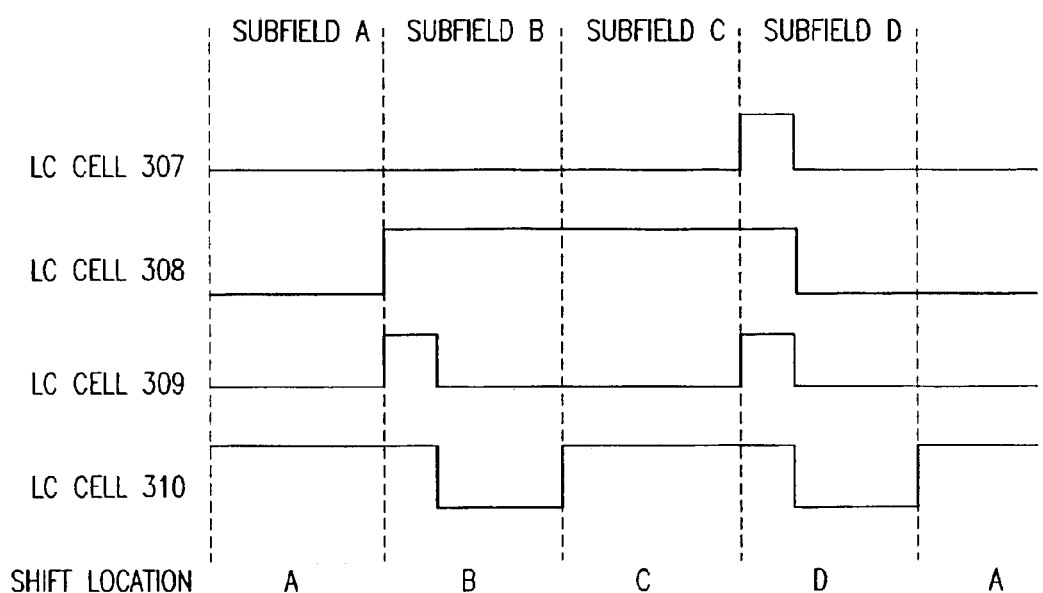
FIG. 24 shows the waveforms of voltages to be applied to the liquid crystal cells included in the optical shifter shown in FIG. 22.

FIG. 24 shows the waveforms of the voltages to be applied to the liquid crystal cells 307, 308, 309 and 310 to operate the liquid crystal cells 307, 308, 309 and 310 as described above. In FIG. 24, the subfields A, B, C and D correspond to the locations A, B, C and D shown in FIGS. 23A, 23B, 23C and 23D, respectively. That is to say, in the subfield period A, the pixel is present at the location A shown in FIG. 23A. In the next subfield period B, the pixel is present at the location B shown in FIG. 23B.

As described above, by using the optical shifter, the number of effective pixels of the liquid crystal panel 207 can be increased fourfold.

In this third preferred embodiment, four projection type optical display systems were prepared with the retardations of the optical compensators changed. Specifically, those four projection type optical display systems were obtained by combining the optical shifter described above with the Types Nos. 5 through 8 optical display systems of the second preferred embodiment described above. Also, as a comparative example, a conventional projection type optical display system, including the same optical shifter and a liquid crystal panel with no optical compensators, was also prepared.

Figure 25B:
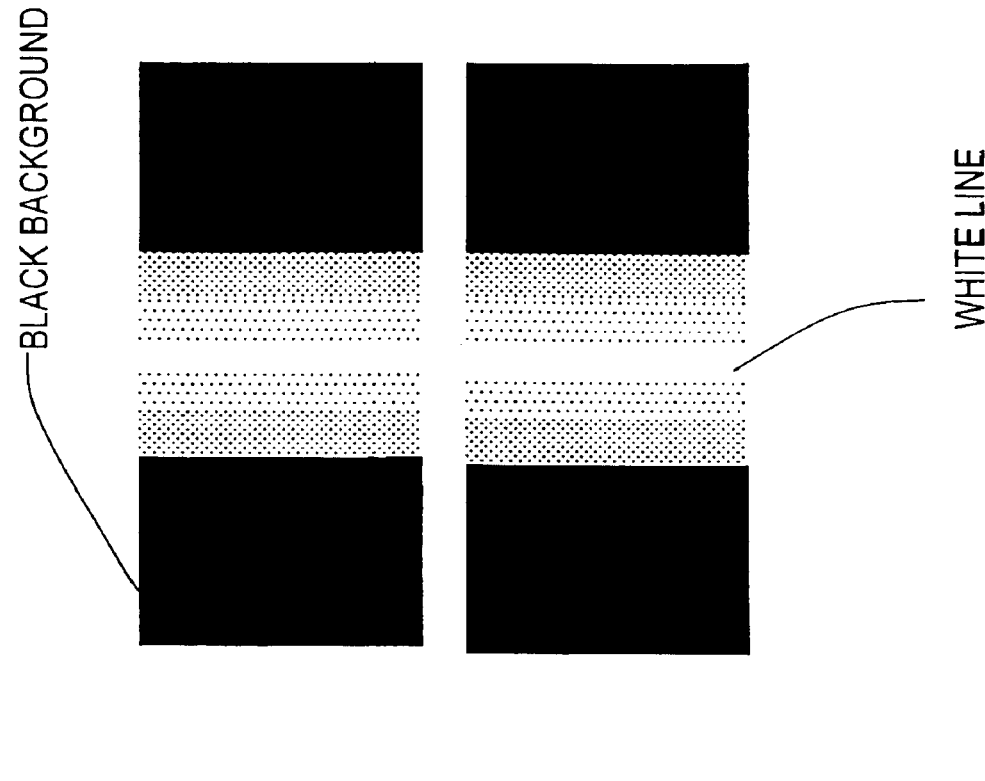
FIG. 25B shows a white cross that was presented on the screen by a conventional projection type optical display system.
Figure 25A:
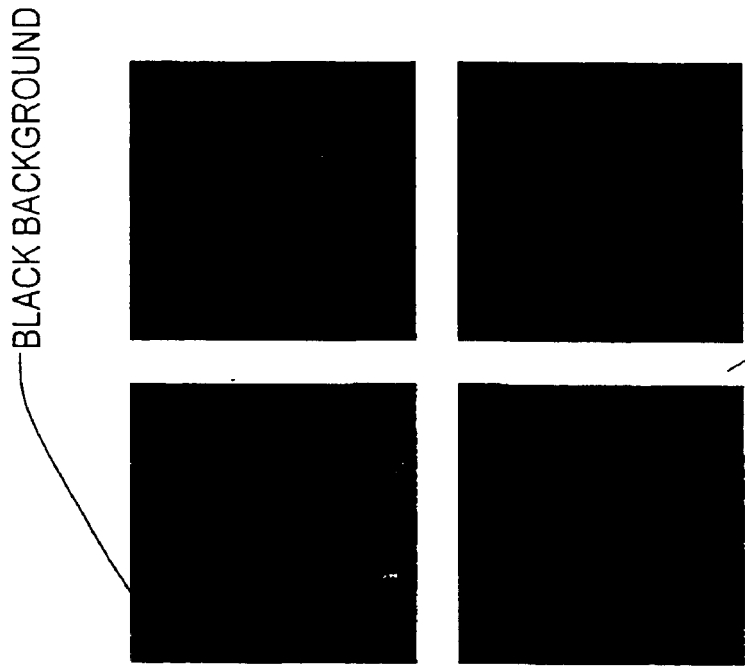
FIG. 25A shows a white cross that was presented on the screen by one of four projection type optical display systems of the third preferred embodiment.

The four projection type optical display systems of the third preferred embodiment and the conventional projection type optical display system were allowed to display a white cross on a black background on the screen. FIG. 25A shows the resultant white cross that was presented on the screen by one of the four projection type optical display systems of the third preferred embodiment. FIG. 25B shows the resultant white cross that was presented on the screen by the conventional projection type optical display system.

As shown in FIG. 25B, the conventional projection type optical display system produced a phenomenon in which black display areas were smeared with white light in the boundaries between white and black display areas, thus resulting in very low display quality. In contrast, the four projection type optical display systems of the third preferred embodiment produced no such phenomena in which the black display areas were smeared with white light but created definite boundaries between the white and black display areas, thus achieving good image quality as shown in FIG. 25A.

A projection type optical display system according to any of various preferred embodiments of the present invention described above achieves a higher contrast ratio than the conventional one.

In a preferred embodiment of the present invention, the projection type optical display system can be used effectively as a display system including an optical shifter.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A projection type optical display system comprising:
   a light source;
   at least one liquid crystal panel for modulating light that has been emitted from the light source; and
   a projection optical device for projecting the light that has gone out of the at least one liquid crystal panel,
   wherein the liquid crystal panel includes:
   a liquid crystal layer;
   a first polarizer and a second polarizer, which are provided on the light incoming side and the light outgoing side of the liquid crystal layer, respectively;

a first uniaxial optical compensator, which is provided between the liquid crystal layer and the first polarizer;
a first biaxial optical compensator, which is provided between the first uniaxial optical compensator and the first polarizer; and
a second biaxial optical compensator, which is provided between the liquid crystal layer and the second polarizer,
wherein if an index ellipsoid of the first and second biaxial optical compensator has a, b and a axes as principal axes and if principal refractive indices on the a, b and a axes are na, nb and no, respectively,
the c axis is substantially parallel to a normal to a major surface of each said biaxial optical compensator,
the a and b axes are defined on the major surface of the biaxial optical compensator, and
nb>nc>na is satisfied.

2. The optical display system of claim 1, wherein if an index ellipsoid of the first uniaxial optical compensator has a, b and c axes as principal axes and if principal refractive indices on the a, b and c axes are na, nb and nc, respectively,
the a axis is substantially parallel to a normal to a major surface of the first uniaxial optical compensator,
the a and b axes are defined on the major surface of the first uniaxial optical compensator, and
na=nb>nc is satisfied.

3. The optical display system of claim 1, wherein an c axis of the first and second biaxial optical compensators defines a tilt angle θ with respect to a normal to a major surface.

4. The optical display system of claim 3, wherein the tilt angle θ defined by the c axis of the first and second biaxial optical compensators with respect to the normal to the major surface is greater than 1 degree but smaller than 20 degrees.

5. The optical display system of claim 1, wherein an c axis of the first uniaxial optical compensator defines a tilt angle θ with respect to a normal to a major surface.

6. The optical display system of claim 5 wherein the tilt angle θ defined by the c axis of the first uniaxial optical compensator with respect to the normal to the major surface is greater than 1 degree but smaller than 20 degrees.

7. The optical display system of claim 1, wherein a total retardation of the first and second biaxial optical compensators, which is given by $d2^r \cdot \Delta nab$ (where $\Delta nab = nb - na$ and $d2^r$ is a total thickness of the first and second biaxial optical compensators), satisfies 200 nm<$d2^r \cdot \Delta nab$<400 nm, and
wherein another total retardation of the first and second biaxial optical compensator, which is given by $d2^r \cdot \Delta nac$ (where $\Delta nac = nc - na$), satisfies 100 nm<$d2^r \cdot \Delta nac$<200 nm.

8. The optical display system of claim 1, wherein a retardation of the first uniaxial optical compensator, which is given by $d1 \cdot \Delta nac$ (where $\Delta nac = nc - na$ and d1 is a thickness of the first uniaxidal optical compensator), satisfies 400 nm<–$d1 \cdot \Delta nac$<700 nm.

9. The optical display system of claim 1, further comprising three liquid crystal panels including the at least one liquid crystal panel,
wherein the light source emits three light rays in three colors falling within mutually different wavelength ranges, and
wherein the light rays in the three colors are incident onto, and modulated by, the three liquid crystal panels, respectively.

10. The optical display system of claim 1,
wherein the light source emits three light rays in three colors falling within mutually different wavelength ranges, and
wherein the light rays in the three colors are incident onto a single liquid crystal panel at mutually different angles, and are modulated by the single liquid crystal panel.

11. The optical display system of claim 1, wherein a normal to a major surface of the at least one liquid crystal panel defines a tilt angle ψ of 1 degree to 15 degrees with respect to the optical axis of a principal light ray that has been emitted from the light source.

12. The optical display system of claim 1, wherein the projection optical device includes a projection lens with an F value of lens than 1.8.

13. The optical display system of claim 1, further comprising:
a circuit for generating data representing multiple subframes from data representing a frame of an image to be formed by the projection optical device on a projection plane and getting the multiple subframes displayed on the at least one liquid crystal panel one after another time-sequentially; and
an optical shifter for optically displacing on the projection plane, selected ones of the multiple subframes being displayed on the at least one liquid crystal panel.

14. The optical display system of claim 13, wherein the optical shifter includes at least one shifting section that periodically displaces an optical axis of incoming light that has been incident on the shifting section, and
wherein the shifting section comprises:
a first liquid crystal cell, which changes a polarization direction of the incoming light from a first direction into a second direction, or vice versa, in response to a first voltage being applied to a liquid crystal layer of the first liquid crystal cell, the first and second directions being perpendicular to each other;
a second liquid crystal cell, which changes the polarization direction of the light that has been transmitted through the liquid crystal layer of the first liquid crystal cell from the first direction into the second direction, or vice versa, in response to a second voltage being applied to a liquid crystal layer of the second liquid crystal cell; and
a birefringent element, which changes its refractive indices according to the polarization direction of the light,
wherein the first liquid crystal cell, the second liquid crystal cell and the birefringent element are arranged such that the incoming light enters the first liquid crystal cell first, is transmitted through the second liquid crystal cell next, and then leaves the second liquid crystal cell, and
wherein the first and second liquid crystal cells are arranged such that a director in an intermediate portion of the liquid crystal layer of the first liquid crystal cell arid a director in an intermediate portion of the liquid crystal layer of the second liquid crystal cell cross each other at right angles.

15. The optical display system of claim 14, wherein the liquid crystal layers of the first and second liquid crystal cells are made of TN mode liquid crystal materials having mutually opposite optical rotatory directions.

16. The optical display system of claim 14, wherein the liquid crystal layers of the first and second liquid crystal cells are made of ECB mode liquid crystal materials.

17. The optical display system of claim 13, further comprising at least one more shifting section that has the same structure and function as the shifting section.

18. The optical display system of claim 1, wherein the liquid crystal panel further includes a second uniaxial optical compensator between the liquid crystal layer and the second biaxial optical compensator.

19. The optical display system of claim 18, wherein if an index ellipsoid of the second uniaxial optical compensator has a, b and a axes as principal axes and if principal refractive indices on the a, b and c axes are na, nb and nc, respectively, the c axis is substantially parallel to a normal to a major surface of the second uniaxial optical compensator.

the a and b axes are defined on the major surface of the second uniaxial optical compensator, and na=nb>nc is satisfied.

20. The optical display system of claim 18, wherein an c axis of the second uniaxial optical compensator defines a tilt angle θ with respect to a normal to a major surface.

21. The optical display system of claim 20, wherein the tilt angle θ defined by the c axis of the second uniaxial optical compensator with respect to the normal to the major surface is greater than 1 degree but smaller than 20 degrees.

22. The optical display system of claim 18, wherein a total retardation of the first and second uniaxial optical compensator, which is given by d1$^r$·Δnac (where Δnac=nc−na and d1$^r$ is a total thickness of the first and second uniaxial optical compensators), satisfies 400 nm<−d1$^r$·Δnac<700 nm.

23. The optical display system of claim 18, wherein a retardation of each of the first and second uniaxial optical compensator, which is given by d1·Δnac (where Δnac=nc−na and d1 is a thickness of the first or second uniaxial optical compensator), satisfies 100 nm<−d1·Δnac<400 nm.

* * * * *